(12) United States Patent
Ayyanar

(10) Patent No.: US 11,152,849 B2
(45) Date of Patent: Oct. 19, 2021

(54) SOFT-SWITCHING, HIGH PERFORMANCE SINGLE-PHASE AC-DC CONVERTER

(71) Applicant: Rajapandian Ayyanar, Chandler, AZ (US)

(72) Inventor: Rajapandian Ayyanar, Chandler, AZ (US)

(73) Assignee: Arizona Board of Regents on behalf of Arizona State University, Scottsdale, AZ (US)

( * ) Notice: Subject to any disclaimer, the term of this patent is extended or adjusted under 35 U.S.C. 154(b) by 0 days.

(21) Appl. No.: 16/894,389

(22) Filed: Jun. 5, 2020

(65) Prior Publication Data

US 2020/0395839 A1 Dec. 17, 2020

Related U.S. Application Data

(60) Provisional application No. 62/858,477, filed on Jun. 7, 2019.

(51) Int. Cl.
*H02M 1/08* (2006.01)
*H02M 7/219* (2006.01)
(Continued)

(52) U.S. Cl.
CPC ......... *H02M 1/083* (2013.01); *H02M 1/4208* (2013.01); *H02M 7/219* (2013.01); *H02M 1/0058* (2021.05); *H02M 1/44* (2013.01)

(58) Field of Classification Search
CPC .... H02M 1/083; H02M 1/4208; H02M 7/219; H02M 1/0058; H02M 1/44
See application file for complete search history.

(56) References Cited

U.S. PATENT DOCUMENTS 8,587,975 B2   11/2013   Jain et al.
8,649,195 B2   2/2014    Mao et al.
(Continued)

FOREIGN PATENT DOCUMENTS

WO   2014004575 A1   1/2014
WO   2015105795 A1   7/2015
(Continued)

OTHER PUBLICATIONS

Ai Gabri et al., "Bridgeless PFC-Modified SEPIC Rectifier With Extended Gain for Universal Input Voltage Applications," IEEE Transactions on Power Electronics, vol. 30, No. 8, Sep. 4, 2014, pp. 4272-4282.

(Continued)

*Primary Examiner* — Adolf D Berhane
(74) *Attorney, Agent, or Firm* — Withrow & Terranova, P.L.L.C.

(57) ABSTRACT

A soft-switching, high-performance single-phase alternating current (AC)-direct current (DC) converter is provided. The AC-DC converter described herein provides a new circuit topology for single-stage, single-phase or multi-phase AC-DC power conversion with power factor correction (PFC) and galvanic isolation using a high-frequency isolation transformer. The AC-DC converter improves power conversion efficiency and power density—two of the most important metrics for a power converter. It achieves soft switching for high frequency switches in the circuit, leading to higher efficiency and lower electromagnetic interference (EMI).

20 Claims, 19 Drawing Sheets

(51) Int. Cl.
*H02M 1/42* (2007.01)
*H02M 1/44* (2007.01)
*H02M 1/00* (2006.01)

(56) References Cited

U.S. PATENT DOCUMENTS

| | | | |
|---|---|---|---|
| 9,413,269 | B2 | 8/2016 | Ayyanar |
| 9,893,174 | B2 | 2/2018 | Chowdhury et al. |
| 2016/0181944 | A1* | 6/2016 | James .................. B60L 55/00 363/17 |
| 2017/0005563 | A1 | 1/2017 | Ayyanar |
| 2018/0198380 | A1* | 7/2018 | Sterna ................ H02M 7/4807 |
| 2018/0198381 | A1* | 7/2018 | Sterna ................ H02M 1/4233 |
| 2018/0278168 | A1* | 9/2018 | Brown ................ H02J 7/0068 |
| 2018/0375465 | A1 | 12/2018 | Ayyanar et al. |
| 2020/0274484 | A1 | 8/2020 | Narayanaswamy et al. |

FOREIGN PATENT DOCUMENTS

| | | |
|---|---|---|
| WO | 2015179671 A1 | 11/2015 |
| WO | 2017096355 A1 | 6/2017 |

OTHER PUBLICATIONS

Athalye et al., "High-performance front-end converter for avionics applications," IEEE Transactions on Areospace and Electronic Systems, vol. 39, No. 2, Apr. 2003, pp. 462-470.

Athalye et al., "Improving efficiency of the active-clamped SEPIC rectifier at high line frequencies," 20th Annual IEEE Applied Power Electronics Conference and Exposition, Mar. 6-10, 2005, Austin, Texas.

Chen et al., "Reduced-order averaged modeling of active clamp converters," IEEE Transactions on Power Electronics, vol. 21, No. 2, Mar. 6, 2006, pp. 487-494.

Choi et al., "Bridgeless Boost Rectifier With Low Conduction Losses and Reduced Diode Reverse-Recovery Problems," IEEE Transactions on Industrial Electronics, vol. 54, No. 2, Mar. 12, 2007, pp. 769-780.

Huang et al., "Review of GaN totem-pole bridgeless PFC," CPSS Transactions on Power Electronics and Applications, vol. 2, No. 3, Sep. 2017, China Power Supply Society, pp. 187-196.

Huber et al., "Performance Evaluation of Bridgeless PFC Boost Rectifiers," IEEE Transactions on Power Electronics, vol. 23, No. 3, May 2, 2008, pp. 165-171.

Ismail, E. H., "Bridgeless SEPIC Rectifier with Unity Power Factor and Reduced Conduction Losses," IEEE Transactions on Industrial Electronics, vol. 56, No. 4, Oct. 1, 2008, pp. 1147-1157.

Jang et al., "A Bridgeless PFC Boost Rectifier With Optimized Magnetic Utilization," IEEE Transactions on Power Electronics, vol. 24, No. 1, Jan. 9, 2009, pp. 85-93.

Kim et al., "Comparative Performance Analysis of High Density and Efficiency PFC Topologies," IEEE Transactions on Power Electronics, vol. 29, No. 6, Aug. 16, 2013, pp. 2666-2679.

Li et al., "Conduction losses and common mode EMI analysis on bridgeless power factor correction," International Conference on Power Electronics and Drive Systems, IEEE, Nov. 2-5, 2009, Taipei, Taiwan, pp. 1255-1260.

Ma et al., "An Improved Bridgeless SEPIC Converter Without Circulating Losses and Input-Voltage Sensing," IEEE Journal of Emerging and Selected Topics in Power Electronics, vol. 6, No. 3, Nov. 1, 2017, pp. 1447-1455.

Mahdavi et al., "Bridgeless SEPIC PFC Rectifier with Reduced Components and Conduction Losses," IEEE Transactions on Industrial Electronics, vol. 58, No. 9, Nov. 29, 2010, pp. 4153-4160.

Mahdavi et al., "High efficiency step up/down PFC rectifier," 2012 International Conference on Applied Electronics, IEEE, Sep. 5-7, 2012, Pilsen, Czech Republic, pp. 179-182.

Musavi et al., "Evaluation and Efficiency Comparison of Front End AC-DC Plug-in Hybrid Charger Topologies," IEEE Iransactions on Smart Grid, vol. 3, No. 1, Oct. 20, 2011, pp. 413-421.

On Semiconductor, "Power Factor Correction (PFC) Handbook," Apr. 2014, Rev. 5, HBD853/D, retrieved from the internet <https://www.onsemi.cn/PowerSolutions/document/HBD853-D.PDF>.

Sabzali et al., "New Bridgeless DCM Sepic and Cuk PFC Rectifiers With Low Conduction and Switching Losses," IEEE Transactions on Industry Applications, vol. 47, No. 2, Jan. 17, 2011, pp. 873-881.

Singh et al., "A PFC based EV battery charger using a bridgeless SEPIC converter," 2016 IEEE 7th Power India International Conference, Nov. 25-27, 2016, Bikaner, India, 6 pages.

Su et al., "An Interleaved Totem-Pole Boost Bridgeless Rectifier With Reduced Reverse-Recovery Problems For Power Factor Correction," IEEE Transactions on Power Electronics, vol. 25, No. 6, Jan. 19, 2010, pp. 1406-1415.

Wu et al., "High-Performance Active-Clamped Isolated SEPIC PFC Converter With SiC Devices and Lossless Diode Clamp," IEEE Journal of Emerging and Selected Topics in Power Electronics, vol. 8, No. 1, Sep. 30, 2019, pp. 567-577.

Wu et al., "Isolated Active-Clamped SEPIC PFC Converter Based on SiC Devices and Integrated Magnetics," 2019 IEEE 7th Workshop on Wide Bandgap Power Devices and Applications, Oct. 29-31, 2019, Raleigh, NC, pp. 151-156.

Yang et al., "Bridgeless SEPIC Converter With a Ripple-Free Input Current," IEEE Transactions on Power Electronics, vol. 28, No. 7, Nov. 12, 2012, pp. 3388-3394.

\* cited by examiner

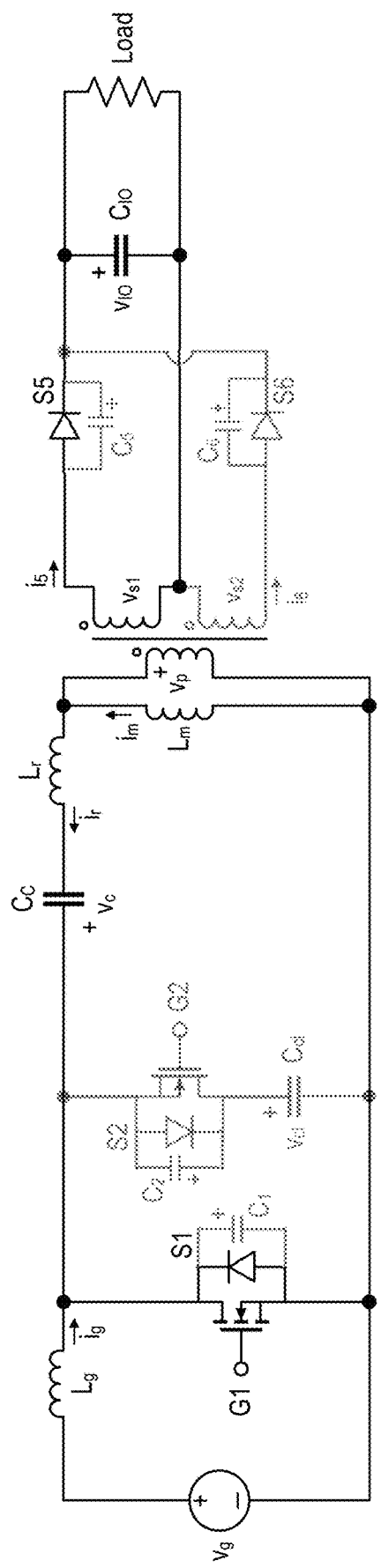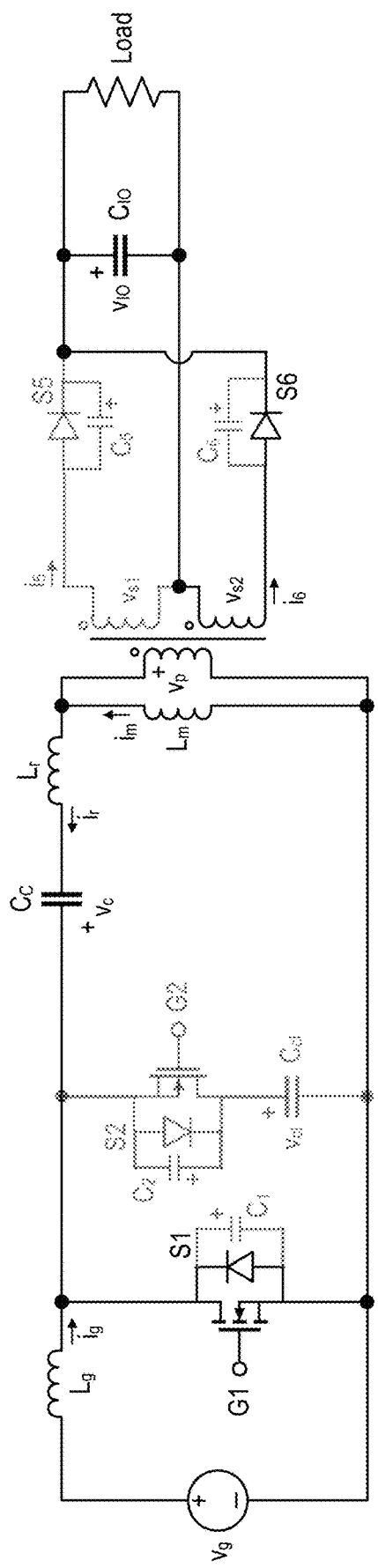
FIG. 3A
FIG. 3B

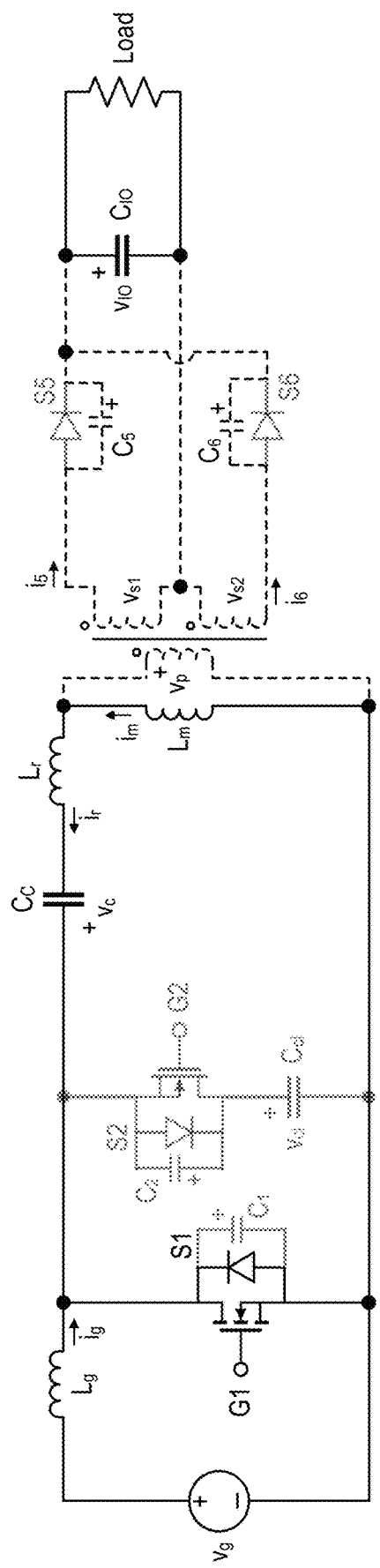
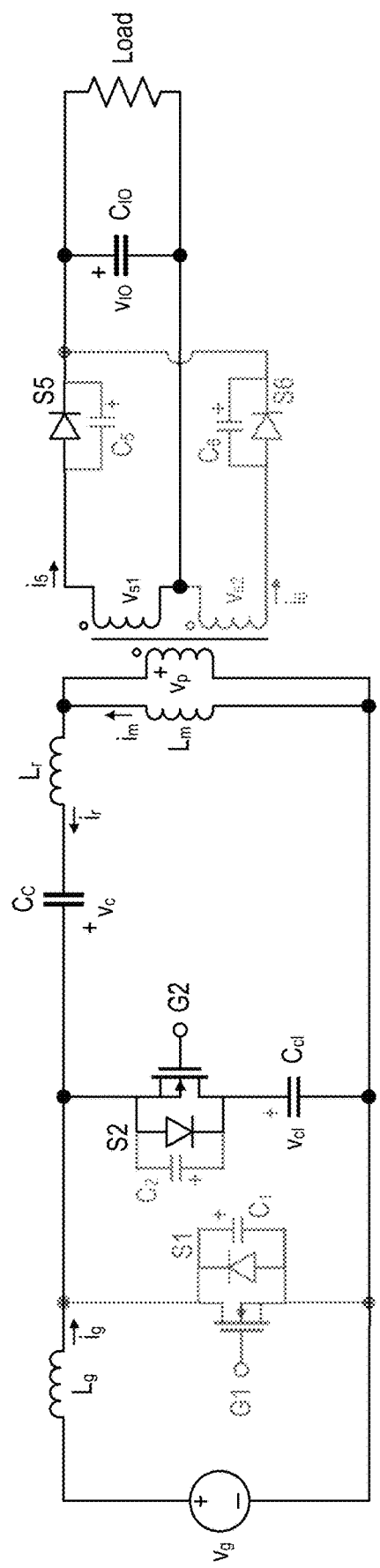
FIG. 3C
FIG. 3D

SOFT-SWITCHING, HIGH PERFORMANCE SINGLE-PHASE AC-DC CONVERTER

RELATED APPLICATIONS

This application claims the benefit of provisional patent application Ser. No. 62/858,477, filed Jun. 7, 2019, the disclosure of which is hereby incorporated herein by reference in its entirety.

GOVERNMENT SUPPORT

This invention was made with government support under DE-EE0006521 awarded by the Department of Energy. The government has certain rights in the invention.

FIELD OF THE DISCLOSURE

This application is related to alternating current (AC)-direct current (DC) conversion.

BACKGROUND

Active power factor correction (PFC) circuits are commonly employed in alternating current (AC)-direct current (DC) converters for various applications in order to obtain high power factor and low harmonic pollution. These converters typically include a full-bridge diode rectifier that introduces high conduction loss especially at low line voltage. In an effort to improve the conversion efficiency, many bridgeless PFC rectifiers have been proposed. Generally, the bridgeless topologies are based on boost-type converters and can reduce the conduction loss by reducing the number of semiconductor components in the line current path. Although the bridgeless boost-type rectifier is very simple and popular, it has some practical drawbacks, such as that the DC output voltage is always higher than the peak input voltage, and input-output isolation cannot be easily implemented.

Single-ended primary-inductor converter (SEPIC) in continuous conduction mode (CCM) is often a good choice for implementing a high performance PFC rectifier since it offers multiple advantages: a) step up/down conversion ratio that enables a wide range of operating voltages; b) single-stage design with ease of isolation; c) low device stresses as compared to isolated boost topologies; d) limited start-up and inrush currents.

Several hard-switched non-isolated bridgeless SEPIC PFC rectifiers have been proposed. The absence of an input diode bridge and the presence of only one diode in the main current path during each switching cycle results in less conduction loss. However, these approaches have significant drawbacks, such as requiring additional components, difficult implementation in an isolated configuration, and/or have limited operating frequency (less than 100 kHz) due to high switching loss, which also limits size reduction of passive components.

High performance PFC rectifiers based on isolated active-clamped SEPIC have been proposed, which have the advantages of: a) significantly reduced switching loss achieved by zero-voltage switching (ZVS) of both the transistors; b) limiting the peak voltage stress on the transistors; c) soft turn off of the output diode; d) higher switching frequency and reduction in the size of the reactive components; e) higher controller bandwidth and well damped control-to-input current response. However, these PFC rectifiers still have a full-bridge diode rectifier at the front end, which has high conduction loss.

SUMMARY

A soft-switching, high-performance single-phase alternating current (AC)-direct current (DC) converter is provided. The AC-DC converter described herein provides a new circuit topology for single-stage, single-phase or multi-phase AC-DC power conversion with power factor correction (PFC) and galvanic isolation using a high-frequency isolation transformer. The AC-DC converter improves power conversion efficiency and power density—two of the most important metrics for a power converter. It achieves soft switching for high frequency switches in the circuit, leading to higher efficiency and lower electromagnetic interference (EMI).

The AC-DC converter is further capable of supporting a wide range of variation in input and output voltages. Some embodiments of the AC-DC converter require only two controlled switches (e.g., transistors for high-frequency switching) for a single-stage conversion (e.g., using diodes for line-frequency switching), resulting in a cost-effective solution for a range of applications. Some embodiments of the AC-DC converter are capable of bidirectional power flow, and therefore allow power to flow from the DC side to the AC side. Some embodiments can provide multiple DC outputs (e.g., at different voltage levels) with a common AC side circuit and isolation transformer.

An exemplary embodiment provides an AC-DC converter, comprising: an AC input/output (I/O) comprising a first AC I/O node and a second AC I/O node. The AC-DC converter further comprises a DC I/O comprising a first DC I/O node and a second DC I/O node. The AC-DC converter further comprises an isolation transformer, comprising: a first coil comprising a first terminal coupled to the first AC I/O node and a second terminal; and a second coil magnetically coupled to the first coil and comprising a third terminal coupled to the first DC I/O node and a fourth terminal coupled to the second DC I/O node. The AC-DC converter further comprises a first switch coupled between the first AC I/O node and a common top node; a second switch coupled between the first AC I/O node and a common bottom node; a first capacitor connected across the first switch and the second switch; a third switch connected between the common top node and the second AC I/O node; and a fourth switch connected between the second AC I/O node and the second terminal of the first coil of the isolation transformer.

Another exemplary embodiment provides a circuit, comprising: an isolation transformer, comprising: a primary coil; and a secondary coil. The circuit further comprises a DC circuit coupled to the isolation transformer; and an AC circuit coupled to the isolation transformer and galvanically isolated from the DC circuit. The AC circuit comprises a bridgeless single-stage power factor correction circuit isolated from the DC circuit.

Another exemplary embodiment provides an AC-DC converter, comprising: an AC I/O comprising a first AC I/O node and a second AC I/O node. The AC-DC converter further comprises an isolated DC I/O comprising a first DC I/O node and a second DC I/O node. The AC-DC converter further comprises an isolation transformer, comprising: a first coil comprising a first terminal coupled to the first AC I/O node and a second terminal coupled to the second AC I/O node; and a second coil magnetically coupled to the first coil and comprising a third terminal coupled to the first DC I/O node and a fourth terminal coupled to the second DC I/O node. The AC-DC converter further comprises a first switch and a second switch connected in series between the first AC I/O node and the second AC I/O node; a third switch and a first capacitor connected in series between the first AC I/O node and the second AC I/O node; and a fourth switch and a second capacitor connected in series between the first AC I/O node and the second AC I/O node.

Those skilled in the art will appreciate the scope of the present disclosure and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the disclosure, and together with the description serve to explain the principles of the disclosure.

FIG. 3A is an equivalent circuit diagram of the first configuration of the AC-DC converter of FIG. 2A during the positive half-cycle and a first interval.

FIG. 3B is an equivalent circuit diagram of the first configuration of the AC-DC converter of FIG. 2A during the positive half-cycle and a second interval.

FIG. 3C is an equivalent circuit diagram of the first configuration of the AC-DC converter of FIG. 2A during the positive half-cycle and a third interval.

FIG. 3D is an equivalent circuit diagram of the first configuration of the AC-DC converter of FIG. 2A during the positive half-cycle and a fifth interval.

DETAILED DESCRIPTION

Figure 1:
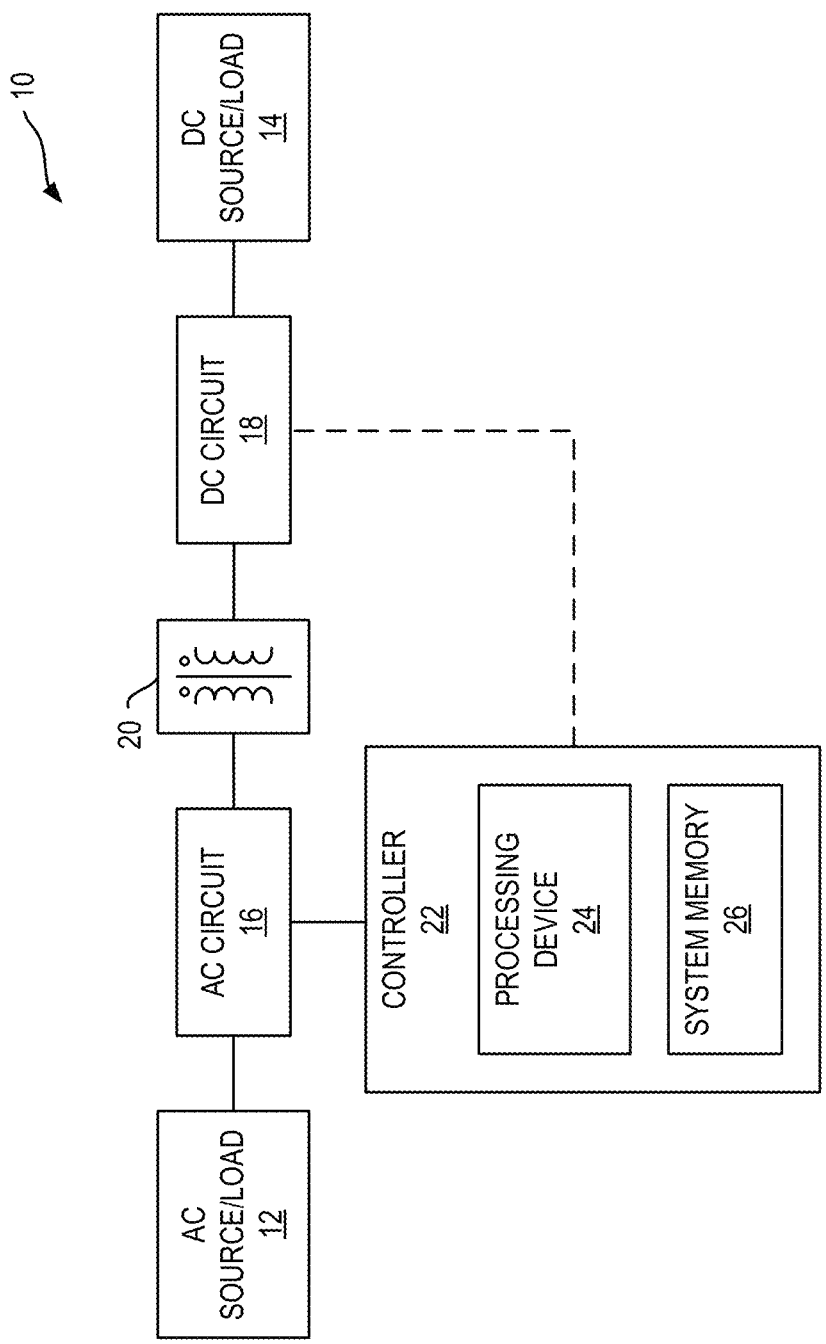
FIG. 1 is a schematic block diagram of an alternating current (AC)-direct current (DC) converter according to embodiments of the present disclosure.

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element such as a layer, region, or substrate is referred to as being "on" or extending "onto" another element, it can be directly on or extend directly onto the other element or intervening elements may also be present. In contrast, when an element is referred to as being "directly on" or extending "directly onto" another element, there are no intervening elements present. Likewise, it will be understood that when an element such as a layer, region, or substrate is referred to as being "over" or extending "over" another element, it can be directly over or extend directly over the other element or intervening elements may also be present. In contrast, when an element is referred to as being "directly over" or extending "directly over" another element, there are no intervening elements present. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

Relative terms such as "below" or "above" or "upper" or "lower" or "horizontal" or "vertical" may be used herein to describe a relationship of one element, layer, or region to another element, layer, or region as illustrated in the Figures. It will be understood that these terms and those discussed above are intended to encompass different orientations of the device in addition to the orientation depicted in the Figures.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

A soft-switching, high-performance single-phase alternating current (AC)-direct current (DC) converter is provided. The AC-DC converter described herein provides a new circuit topology for single-stage, single-phase or multi-phase AC-DC power conversion with power factor correction (PFC) and galvanic isolation using a high-frequency isolation transformer. The AC-DC converter improves power conversion efficiency and power density—two of the most important metrics for a power converter. It achieves soft switching for high frequency switches in the circuit, leading to higher efficiency and lower electromagnetic interference (EMI).

The AC-DC converter is further capable of supporting a wide range of variation in input and output voltages. Some embodiments of the AC-DC converter require only two controlled switches (e.g., transistors for high-frequency switching) for a single-stage conversion (e.g., using diodes for line-frequency switching), resulting in a cost-effective solution for a range of applications. Some embodiments of the AC-DC converter are capable of bidirectional power flow, and therefore allow power to flow from the DC side to the AC side. Some embodiments can provide multiple DC outputs (e.g., at different voltage levels) with a common AC side circuit and isolation transformer.

FIG. 1 is a schematic block diagram of an AC-DC converter 10 according to embodiments of the present disclosure. The AC-DC converter 10 provides single-stage AC-DC power conversion with PFC and galvanic isolation. The AC-DC converter 10 can provide AC to DC conversion and/or DC to AC conversion as described further below. Thus, the AC-DC converter 10 can connect to an AC source or load 12 (e.g., a single-phase or multi-phase AC source or load) and a DC source or load 14.

In an exemplary aspect, the AC-DC converter 10 includes an AC circuit 16 and a DC circuit 18, with an isolation transformer 20 providing galvanic isolation between the AC circuit 16 and the DC circuit 18. The AC circuit 16 includes a bridgeless single-stage PFC circuit isolated from the DC circuit 18, which improves power conversion efficiency and power density over traditional approaches. In an exemplary aspect, the AC circuit 16 includes high-frequency switches which provide soft switching and allow for use of a high-frequency isolation transformer 20 and a reduction in the overall size of the AC-DC converter 10. This further leads to higher efficiency in the conversion and reduces EMI.

Embodiments described herein further include a controller 22 to control operation of the AC-DC converter 10, such as by controlling switching of the AC circuit 16. In some examples, the controller 22 further controls operation of the DC circuit 18 (e.g., to provide control of switches in the DC circuit 18, enable reversible operation of the AC-DC converter 10, etc.). The controller 22 includes or is implemented as any computing or electronic device capable of including firmware, hardware, and/or executing software instructions that could be used to perform any of the methods or functions of the AC-DC converter 10 described further below. In this regard, the controller 10 may be a circuit or circuits included in an electronic board card, such as a printed circuit board (PCB), and in some embodiments may be implemented in a server, a personal computer, a desktop computer, a laptop computer, an array of computers, a personal digital assistant (PDA), a computing pad, a mobile device, or any other device.

In some embodiments, the controller 22 includes a processing device 24 or processor and a system memory 26. The system memory 26 may include non-volatile memory (e.g., read-only memory (ROM), erasable programmable ROM (EPROM), electrically erasable programmable ROM (EEPROM)) and volatile memory (e.g., random-access memory (RAM), dynamic RAM (DRAM), and synchronous DRAM (SDRAM)).

The processing device 24 represents one or more commercially available or proprietary general-purpose processing devices, such as a microprocessor, central processing unit (CPU), or the like. More particularly, the processing device 24 may be a complex instruction set computing (CISC) microprocessor, a reduced instruction set computing (RISC) microprocessor, a very long instruction word (VLIW) microprocessor, a processor implementing other instruction sets, or other processors implementing a combination of instruction sets. The processing device 24 is configured to execute processing logic instructions for performing the operations and steps discussed herein.

The processing device 24 may be implemented as a microprocessor, field programmable gate array (FPGA), a digital signal processor (DSP), an application-specific integrated circuit (ASIC), or other programmable logic device, a discrete gate or transistor logic, discrete hardware components, or any combination thereof designed to provide control of the AC-DC converter 10 and perform functions described herein.

The AC-DC converter 10 implements a novel circuit topology to achieve PFC and high-frequency transformer isolation in a single-stage approach (which can be expanded to an additional stage for further DC processing as needed). Soft-switching (zero voltage transitions) is readily provided by the topology of the AC circuit 16 (using the controller 22 for switching control) without the need for auxiliary circuits.

Figure 7:
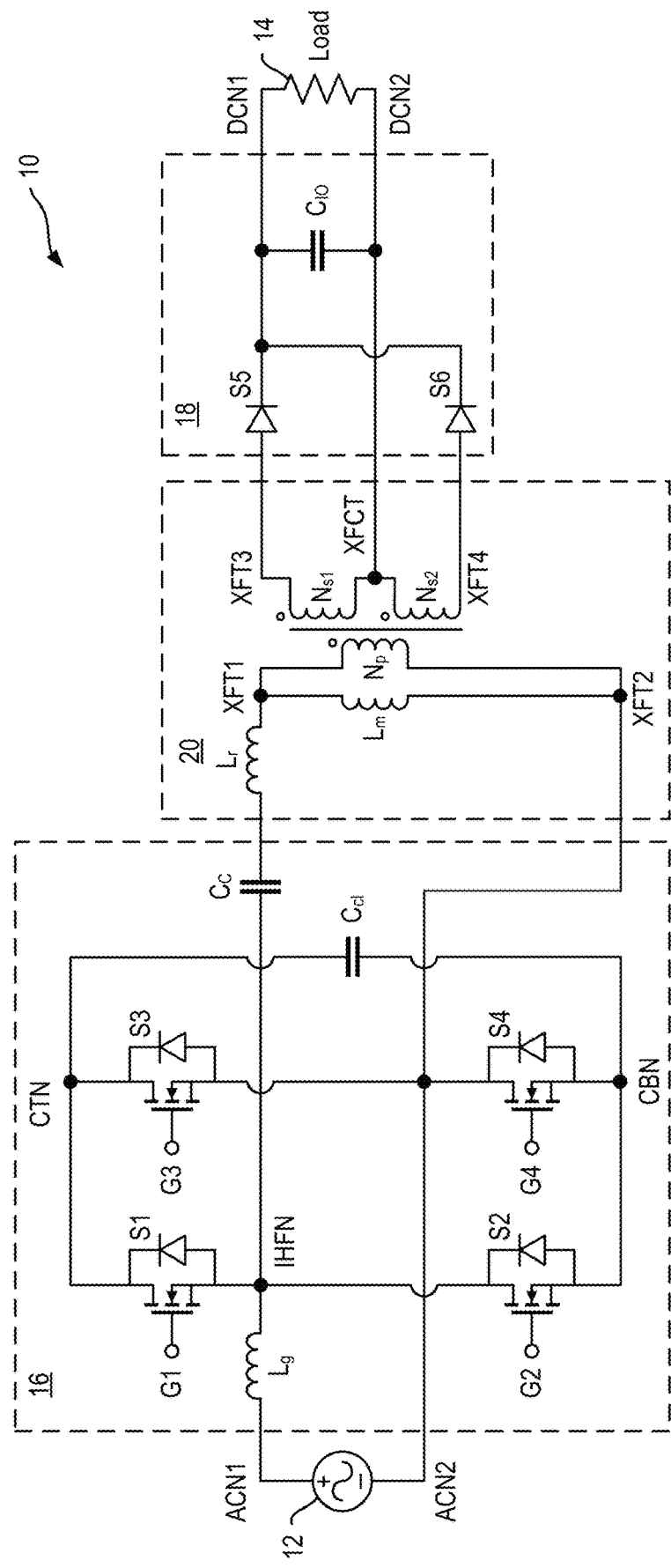
FIG. 7 is a schematic diagram of an exemplary second configuration of the AC-DC converter of FIG. 1.
Figure 8:
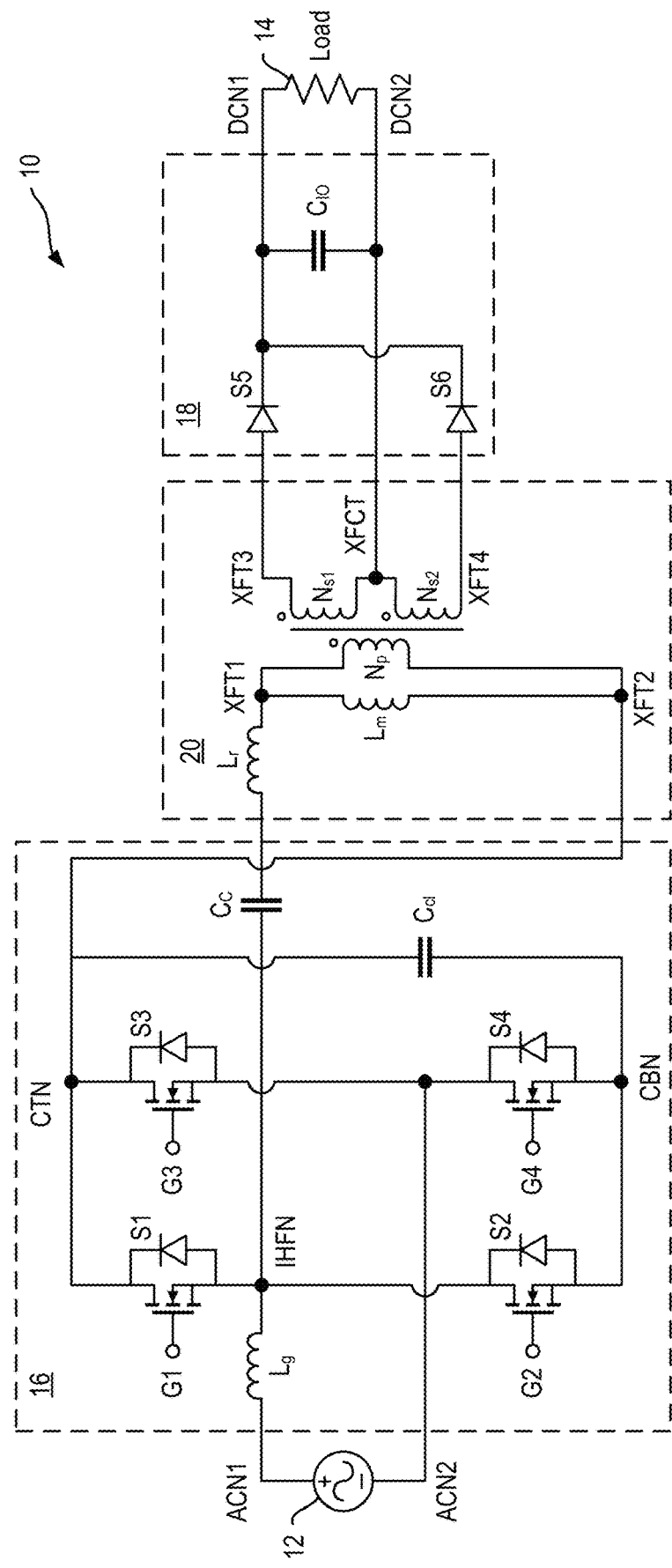
FIG. 8 is a schematic diagram of an exemplary third configuration of the AC-DC converter of FIG. 1.
Figure 9:
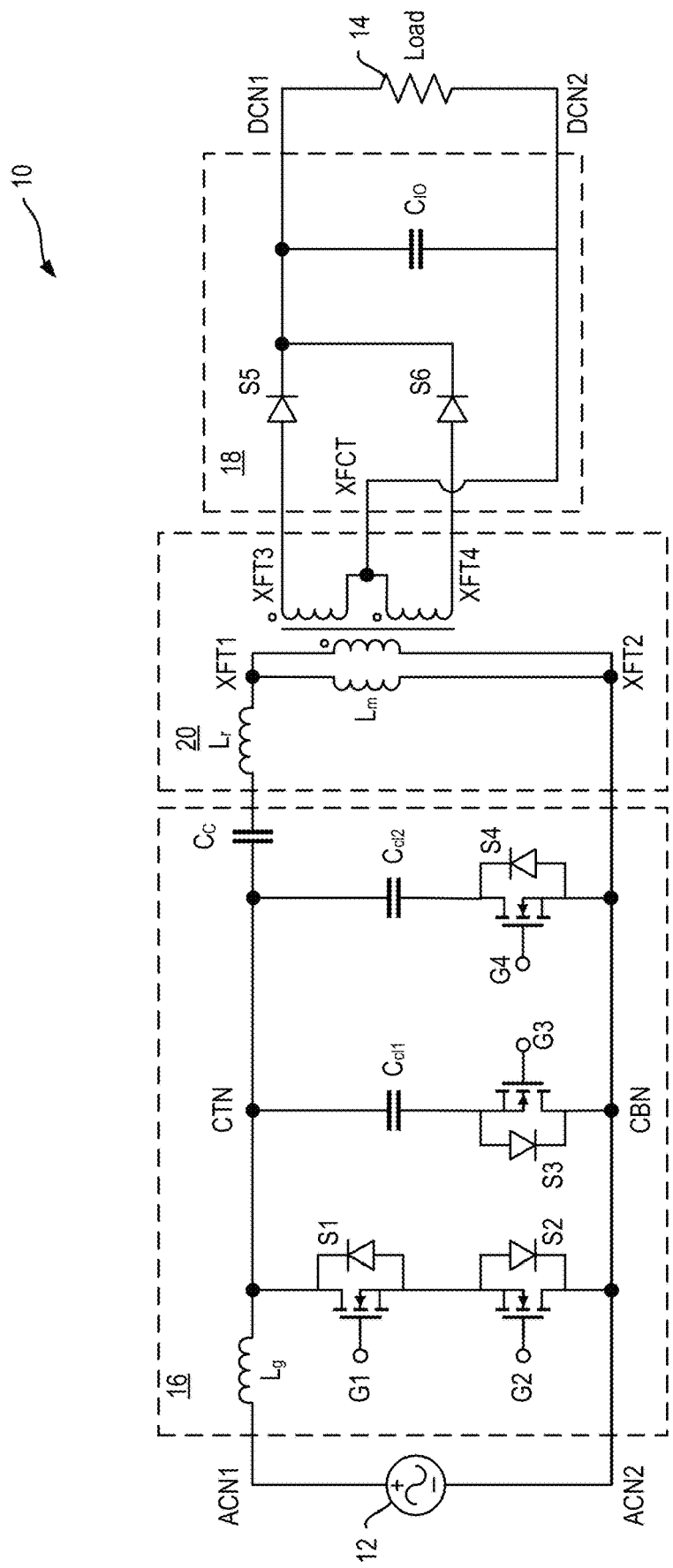
FIG. 9 is a schematic diagram of an exemplary fourth configuration of the AC-DC converter of FIG. 1.

A first configuration of the circuit topology and several variations are illustrated in FIGS. 2A-2D and 6A-6D. The operation of the AC-DC converter 10 is further described below with respect to FIGS. 3A-3H, with reference to operating waveforms illustrated in FIGS. 4A and 4B. There are also innovations in the control and design that lead to optimization of the size and efficiency of the high frequency isolation transformer 20. The topology, control and pulse width modulation (PWM) methods have been fully developed and validated in detailed simulations illustrated in FIGS. 5A-5L and in tested hardware. Multiple additional configurations of the circuit topology are illustrated in FIGS. 7-9.

Figure 2A:
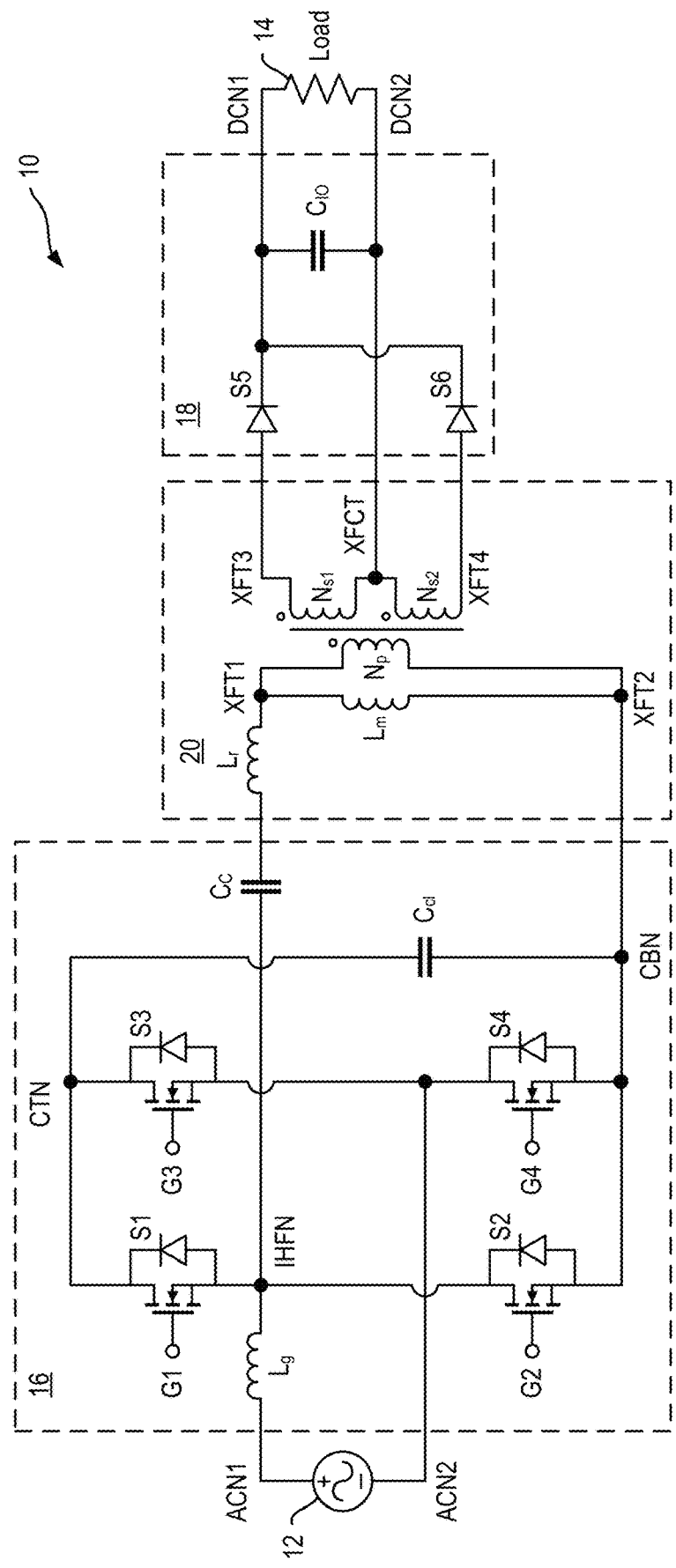
FIG. 2A is a circuit diagram of an exemplary first configuration of the AC-DC converter of FIG. 1.

FIG. 2A is a circuit diagram of an exemplary first configuration of the AC-DC converter 10 of FIG. 1. The AC-DC converter 10 is a bridgeless totem-pole with PFC, which preserves the advantages of active-clamped single-ended primary-inductor converter (SEPIC) as described in the background and further improves efficiency by removing the front-end diode bridge and its associated conduction losses. The AC-DC converter 10 has an AC input/output (I/O) (connected to an AC source as shown or an AC load in other embodiments) with a first AC I/O node ACN1 and a second AC I/O node ACN2. The AC circuit 16 is coupled between the AC I/O and a first coil (e.g., a primary coil) of the isolation transformer 20 (e.g., at a first transformer terminal XFT1 and a second transformer terminal XFT2).

The AC-DC converter 10 also has a DC I/O (connected to a DC load as shown or a DC source in other embodiments) with a first DC I/O node DCN1 and a second DC I/O node DCN2. The DC circuit 18 is coupled between the DC I/O and a second coil (e.g., a secondary coil) of the isolation transformer 20 (e.g., at a third transformer terminal XFT3, a fourth transformer terminal XFT4, and a transformer center-tap XFCT).

The AC circuit 16 provides single-stage conversion with PFC using high-frequency zero-voltage switching (ZVS), in conjunction with line-frequency switching and a clamping capacitor $C_{cl}$. A first switch S1 and a second switch S2 provide the high-frequency ZVS, with the first switch S1 coupled between the first AC I/O node ACN1 and a common top node CTN. More particularly, one terminal of the first switch S1 is connected to an intermediate high-frequency node IHFN (with an AC I/O inductor $L_g$ connected between the first AC I/O node ACN1 and the intermediate high-frequency node IHFN) and the other terminal is connected to the common top node CTN. The second switch S2 is coupled between the first AC I/O node ACN1 and a common bottom node CBN. More particularly, one terminal of the second switch S2 is connected to the intermediate high-frequency node IHFN and the other terminal is connected to the common bottom node CBN.

A third switch S3 and a fourth switch S4 provide the line-frequency switching, with the third switch S3 connected between the second AC I/O node ACN2 and the common top node CTN. The fourth switch S4 is coupled between the second AC I/O node ACN2 and the common bottom node CBN. The clamping capacitor $C_{cl}$ is coupled across the first switch S1 and the second switch S2 (as well as across the third switch S3 and the fourth switch S4). That is, the clamping capacitor $C_{cl}$ is connected between the common top node CTN and the common bottom node CBN.

The first transformer terminal XFT1 is coupled to the first AC I/O node ACN1 (e.g., connected to a coupling capacitor $C_C$, which is connected to the intermediate high-frequency node IHFN). The second transformer terminal XFT2 is connected to the common bottom node CBN.

The AC circuit 16 facilitates soft-switching (zero voltage transitions) without needing auxiliary circuits. A first gate terminal G1 of the first switch S1 and a second gate terminal G2 of the second switch S2 can be voltage-controlled or current controlled by the controller 22 such that a respective switch is enabled when the voltage across the switch reaches zero. The switching frequency of the first switch S1 and the second switch S2 is a significantly higher frequency than the line frequency of the AC input/load at which the third switch S3 and the fourth switch S4 are operated (e.g., 50 hertz (Hz), 60 Hz, 400 Hz, 800 Hz, or another appropriate line frequency, such as between 20 Hz and 1000 Hz or between 49 Hz and 61 Hz). For example, the switching frequency of the first switch S1 and the second switch S2 can be 50 kilohertz (kHz) to 500 kHz (or a similarly high frequency).

In the embodiment illustrated in FIG. 2A, the first switch S1, the second switch S2, the third switch S3, and the fourth switch S4 are transistors. These switches S1, S2, S3, S4 can be any appropriate transistor, including voltage-controlled or current controlled transistors. In an exemplary aspect, each switch S1, S2, S3, S4 in the AC circuit 16 is a field-effect transistor (FET), such as a power metal-oxide-semiconductor FET (MOSFET) (e.g., an enhancement mode or depletion mode MOSFET), rated for operation in accordance with the AC line voltage (e.g., 110 volt (V), 208V, 220V, 277V, 480V) of the AC source/load 12, magnitude of the internal DC link voltage (e.g., across the clamping capacitor $C_{cl}$), and current demands of the AC-DC converter 10.

The DC circuit 18 includes a rectifier, such as a center-tap rectifier as shown. In this regard, the DC circuit 18 includes a fifth switch S5 and a sixth switch S6 (which may be diodes, transistors, or another appropriate switching element). The fifth switch S5 is connected between the third transformer terminal XFT3 of the second coil of the isolation transformer 20 and the first DC I/O node DCN1. The sixth switch S6 is connected between the fourth transformer terminal XFT4 of the second coil of the isolation transformer 20 and the first DC I/O node DCN1.

The transformer center-tap XFCT is connected to the second DC I/O node DCN2 to complete the center-tap rectifier. The isolation transformer 20 is illustrated having a resonant inductor $L_r$ in series with the first coil and a magnetizing inductance $L_m$ in parallel with the first coil. It should be understood that the resonant inductor $L_r$ can be partly or fully realized by a leakage inductance of the isolation transformer 20. In some examples, the isolation transformer 20 can also provide voltage step-up or stepdown between the AC circuit 16 and the DC circuit 18 without need for an additional buck or boost converter.

Generally, the DC circuit 18 further includes one or more I/O capacitors $C_{IO}$ to reduce ripple voltage at the DC I/O, though these may be provided external to the DC circuit 18 in some examples. In some embodiments, a different rectifier may be implemented in the DC circuit 18, such as a full-wave rectifier (e.g., where the second coil of the isolation transformer 20 does not include a center-tap).

Compared to current technology, especially two stage power conversion approaches, the AC-DC converter 10 described herein results in loss reduction by around 40% to 60% and a corresponding improvement in efficiency. Soft switching (e.g., ZVS with the first switch S1 and the second switch S2) allows the AC-DC converter 10 to switch at very high frequencies, leading to smaller filters and a smaller transformer, which together with small heat sinks result in significant improvement in power density.

The isolation transformer 20 makes it simple to achieve multiple, isolated outputs of different voltage levels. The configuration also leads to negligible ground leakage currents. In addition, the peak voltage stress on the output diode (the fifth switch S5 and the sixth switch S6) is inherently clamped by the center-tapped transformer configuration, a function that was achieved by a separate clamp diode and an auxiliary winding in some prior approaches.

Figure 2B:
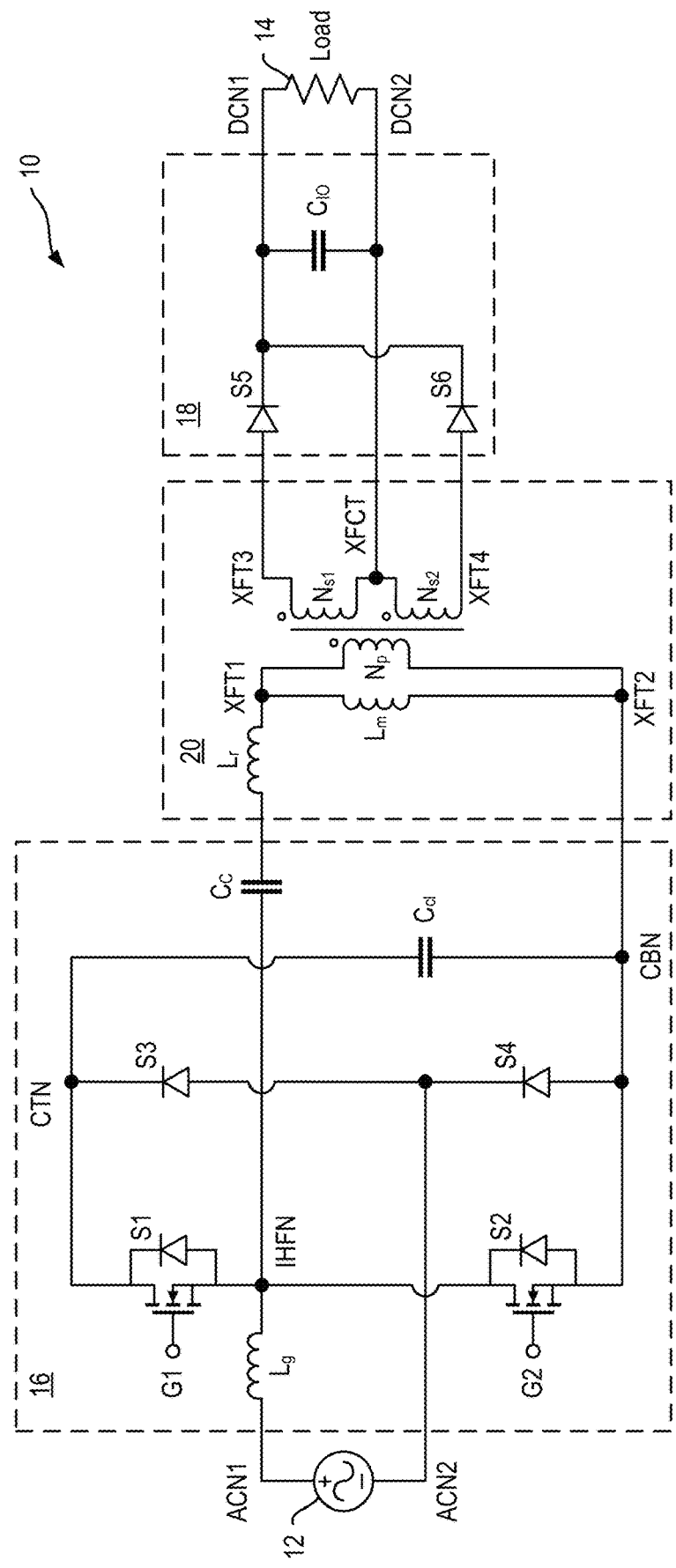
FIG. 2B is a circuit diagram of an alternative embodiment of the first configuration of the AC-DC converter of FIG. 2A.

FIG. 2B is a circuit diagram of an alternative embodiment of the first configuration of the AC-DC converter 10 of FIG. 2A. In some examples (e.g., in low-power and cost-sensitive applications), only the high-frequency switches (the first switch S1 and the second switch S2) are controlled switches (e.g., MOSFETS). This can provide a cost-effective and reduced size solution by using diodes for each of the third switch S3, fourth switch S4, fifth switch S5, and sixth switch S6.

Figure 2C:
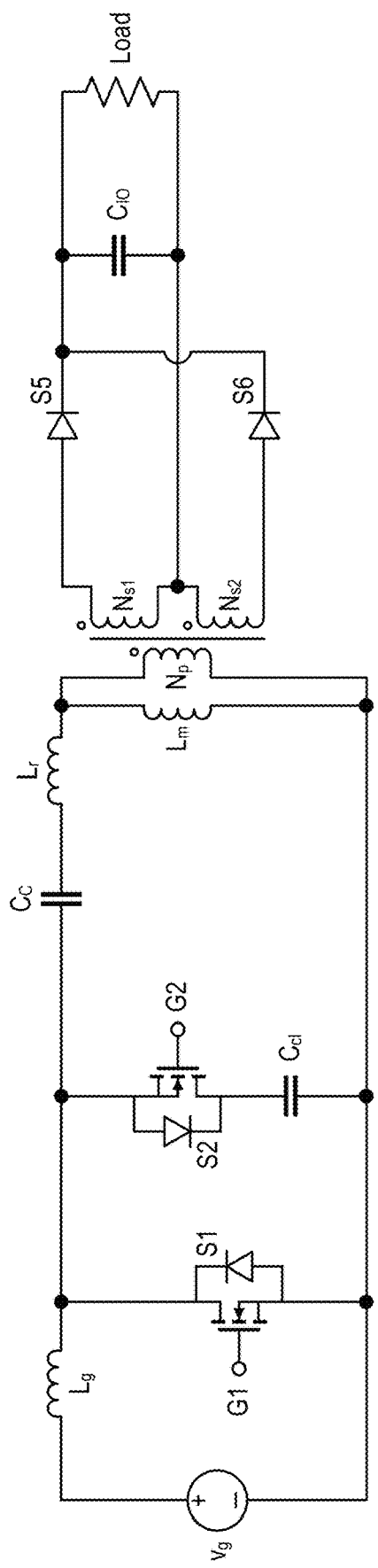
FIG. 2C is an equivalent circuit diagram of the first configuration of the AC-DC converter of FIG. 2A during a positive half-cycle.

FIG. 2C is an equivalent circuit diagram of the first configuration of the AC-DC converter 10 of FIG. 2A during a positive half-cycle. As described above, the first switch S1 and the second switch S2 are high-frequency switches, and the third switch S3 and the fourth switch S4 are line-frequency switches, which may also be replaced by diodes. During the positive half-cycle, the fourth switch S4 is always on while the third switch S3 is always off. The body diode of the third switch S3 is reverse biased by the voltage of the clamping capacitor $C_{cl}$. The fourth switch S4 (omitted from FIG. 2C for clarity), now in series with the AC I/O inductor $L_g$, conducts the non-pulsating input current.

The transformer 20 is illustrated with the first coil having a primary winding $N_p$. The second coil has a first secondary winding $N_{s1}$ and a second secondary winding $N_{s2}$. The secondary winding $N_{s2}$ and the sixth switch S6 support the main operation in the negative half-cycle as well as act as a lossless snubber in the positive half-cycle for the output rectifier through the fifth switch S5.

Figure 2D:
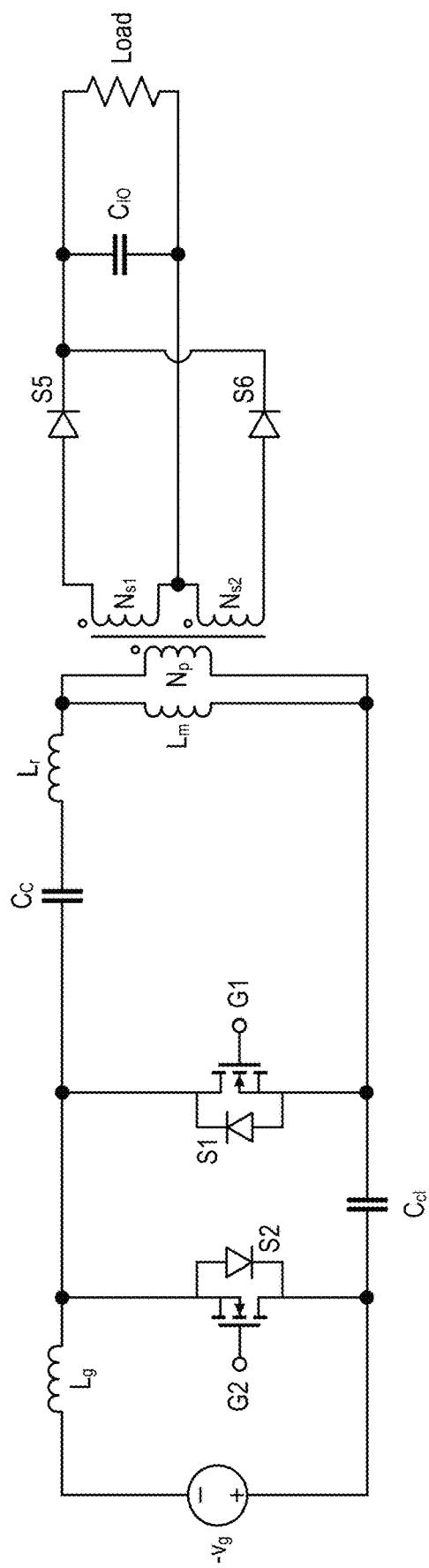
FIG. 2D is an equivalent circuit diagram of the first configuration of the AC-DC converter of FIG. 2A during a negative half-cycle.

FIG. 2D is an equivalent circuit diagram of the first configuration of the AC-DC converter 10 of FIG. 2A during a negative half-cycle. During the negative half-cycle, the third switch S3 is always on while the fourth switch S4 is always off. The body diode of the fourth switch S4 is reverse biased by the voltage of the clamping capacitor $C_{cl}$. The third switch S3 (omitted from FIG. 2D for clarity) conducts the non-pulsating input current. Similar to the positive half-cycle in FIG. 2C, in the negative half-cycle the sixth switch S6 is the output rectifier, and the first secondary winding $N_{s1}$ and the fifth switch S5 act as a lossless snubber for the sixth switch S6.

Steady-state operation of the converter in positive half-cycle and negative half-cycle is described below with respect to FIGS. 3A-3H. An AC I/O inductor current $i_g$, a magnetizing inductor current $i_m$, a coupling capacitor voltage $v_c$, a clamping capacitor voltage $v_{cl}$ and a DC I/O voltage $v_{IO}$ are all assumed to have small switching ripple. The turns ratio between the primary winding $N_p$ and the two secondary windings $N_{s1}$, $N_{s2}$ of the transformer 20 is $N_p:N_{s1}:N_{s2}=n:1:1$.

The equivalent circuits of the main quasi-static operating modes during the positive half-cycle of the input voltage are shown in FIGS. 3A-3D. The corresponding operating waveforms are shown in FIG. 4A. The operation is described with respect to AC to DC conversion with the AC I/O as a voltage source and the DC I/O as a load, but similar operation occurs when operated in reverse (see FIG. 6A below).

FIG. 3A is an equivalent circuit diagram of the first configuration of the AC-DC converter 10 of FIG. 2A during the positive half-cycle and a first interval. During the first interval $[t_0, t_1]$, the main switch (first switch S1) and the output rectifier (the fifth switch S5) are both on. The active clamp switch (second switch S2) is off. Two secondary winding voltages $v_{s1}$, $v_{s2}$ are both equal to the DC I/O voltage $v_{IO}$, while the voltage across the magnetizing inductor is clamped to $n*v_{IO}$. The sixth switch S6 is reverse biased with voltage $2*v_{IO}$. The magnetizing inductor $L_m$ is discharged by the DC I/O voltage $v_{IO}$. A resonant inductor current $i_r$ increases linearly with slope $(n*v_{IO}+v_C)/L_r$. This interval ends when the resonant inductor current $i_r$ becomes equal to the magnetizing current, causing the fifth switch S5 to turn off and the sixth switch S6 to turn on.

FIG. 3B is an equivalent circuit diagram of the first configuration of the AC-DC converter 10 of FIG. 2A during the positive half-cycle and a second interval. During the second interval $[t_1, t_2]$, when the fifth switch S5 starts to turn off and the sixth switch S6 starts to turn on, their equivalent output capacitors C5, C6 get charged and discharged, respectively, through resonance with the resonant inductor $L_r$. The resonant inductor current $i_r$ increases by a small amount, which is negligible since the energy associated with the diode output capacitors are very small. The sixth switch S6 starts to conduct when the voltage across its equivalent output capacitor C6 decreases to zero. The second secondary winding $N_{s2}$ is then clamped to $-v_{IO}$. The reverse voltage across the fifth switch S5 will be clamped to $2*v_{IO}$, and the voltage across the magnetizing inductor will be clamped to $-n*v_{IO}$. The resonant inductor current $i_r$ decreases with slope $(-n*v_{IO}+v_C)/L_r$. This interval ends when the resonant inductor current $i_r$ becomes equal to the magnetizing current again.

FIG. 3C is an equivalent circuit diagram of the first configuration of the AC-DC converter 10 of FIG. 2A during the positive half-cycle and a third interval. During the third interval $[t_2, t_3]$, the fifth switch S5 and the sixth switch S6 are both off. The output capacitors C5 and C6 resonate with the resonant inductor $L_r$ with frequency $\omega_{res}=1/\sqrt{L_{rm}C_{eq}}$, where $C_{eq}=C_5+C_6$ and $L_{rm}=L_rL_m/(L_r+L_m)\approx L_r$ since $L_m \gg L_r$. Since the output capacitance of the diodes is very low, the corresponding impedance is very high. The part of the circuit illustrated with dashed lines can be considered open. The resonant inductor $L_r$ can be considered in series with the magnetizing inductor $L_m$, and both are charged by the coupling capacitor $C_C$. The main switch (first switch S1) is turned off at the end of this interval.

During a fourth interval $[t_3, t_4]$ (not shown due to its short switching transition), the first switch S1 is turned off. The sum of the input inductor current and the resonant inductor current $i_g+i_r$ charges the output capacitor C1 of the first switch S1 and discharges the output capacitor C2 of the second switch S2. The second switch S2 is turned on with zero drain-source voltage. C6 and C5 get charged and discharged, respectively, through resonance with the resonant inductor $L_r$.

FIG. 3D is an equivalent circuit diagram of the first configuration of the AC-DC converter 10 of FIG. 2A during the positive half-cycle and a fifth interval. During the fifth interval [$t_4$, $t_5$], the second switch S2 and the fifth switch S5 are on. The first switch S1 and the sixth switch S6 are off. The magnetizing inductor $L_m$ is clamped by the DC I/O voltage $v_{IO}$. The voltage across the resonant inductor $L_r$ is equal to $n*v_{IO}+v_C-v_e$. Both $i_r$ and $i_m$ decrease. This interval ends when the second switch S2 is turned off again.

During a sixth interval [$t_5$, $t_0$] (not shown due to its short switching transition), the fifth switch S5 continues to be on. $i_g+i_r$ is negative, and the output capacitor of the first switch S1 is discharged when the second switch S2 is turned off. The body diode of the first switch S1 then starts to conduct, allowing the first switch S1 to be turned on with zero drain-source voltage.

The equivalent circuits of the main quasi-static operating modes during the negative half-cycle of the input voltage are shown in FIGS. 3E-3H. The corresponding operating waveforms are shown in FIG. 4B.

Figure 3E:
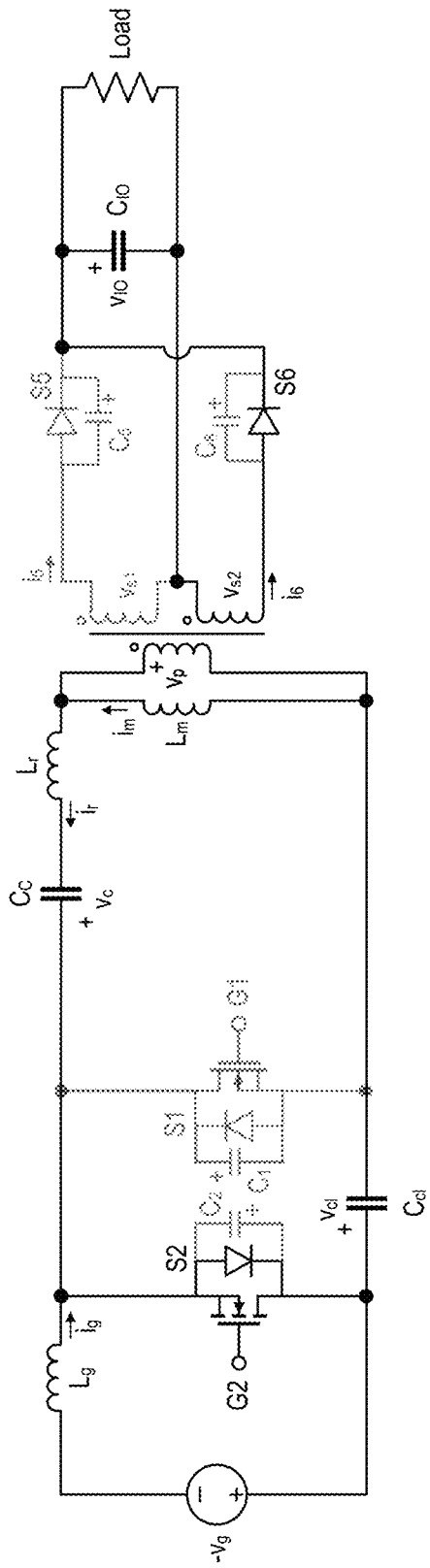
FIG. 3E is an equivalent circuit diagram of the first configuration of the AC-DC converter of FIG. 2A during the negative half-cycle and the first interval.
Figure 4A:
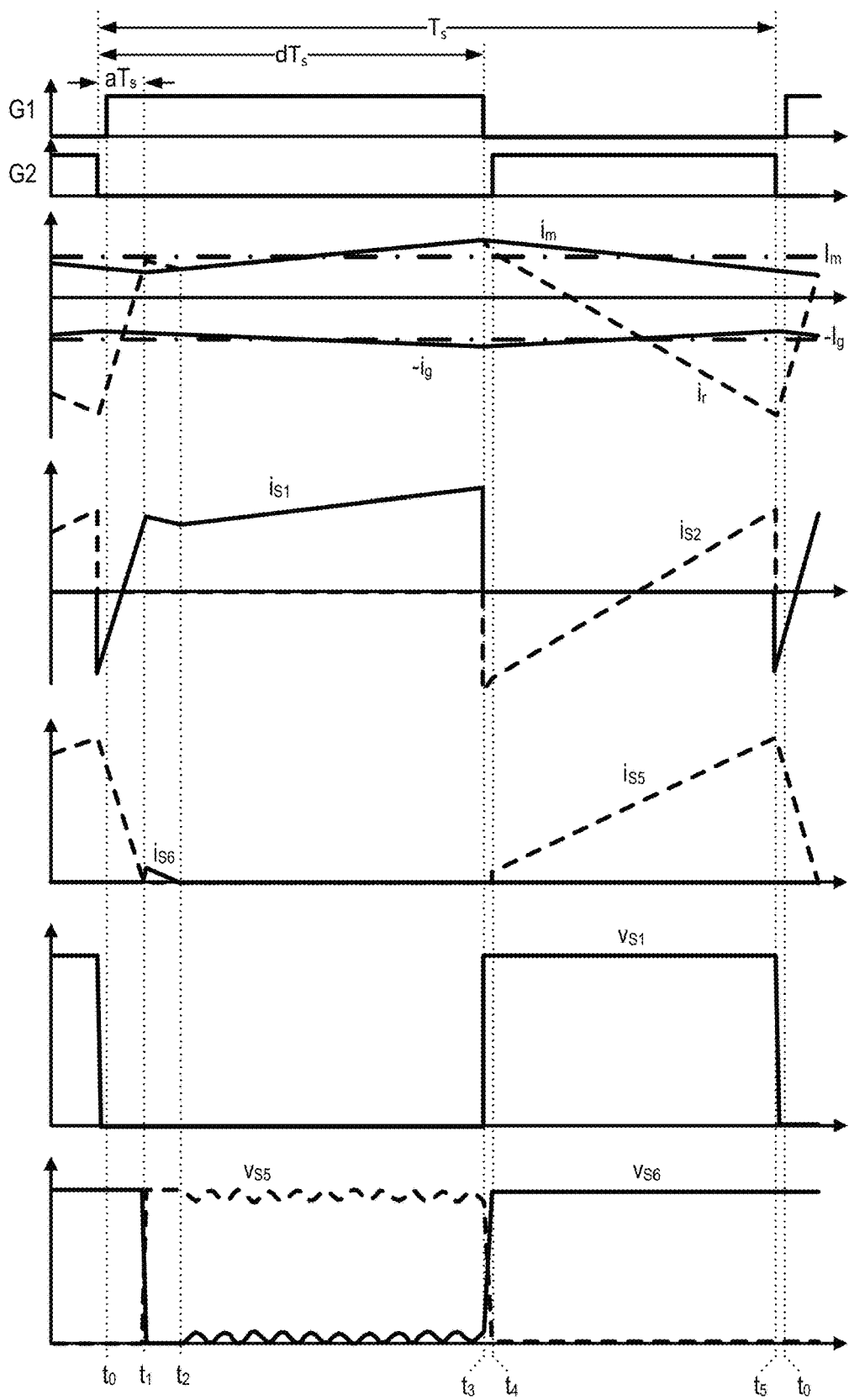
FIG. 4A is a graphical representation of operating waveforms of the first configuration of the AC-DC converter of FIG. 2A during the positive half-cycle as illustrated in FIGS. 3A-3D.
Figure 4B:
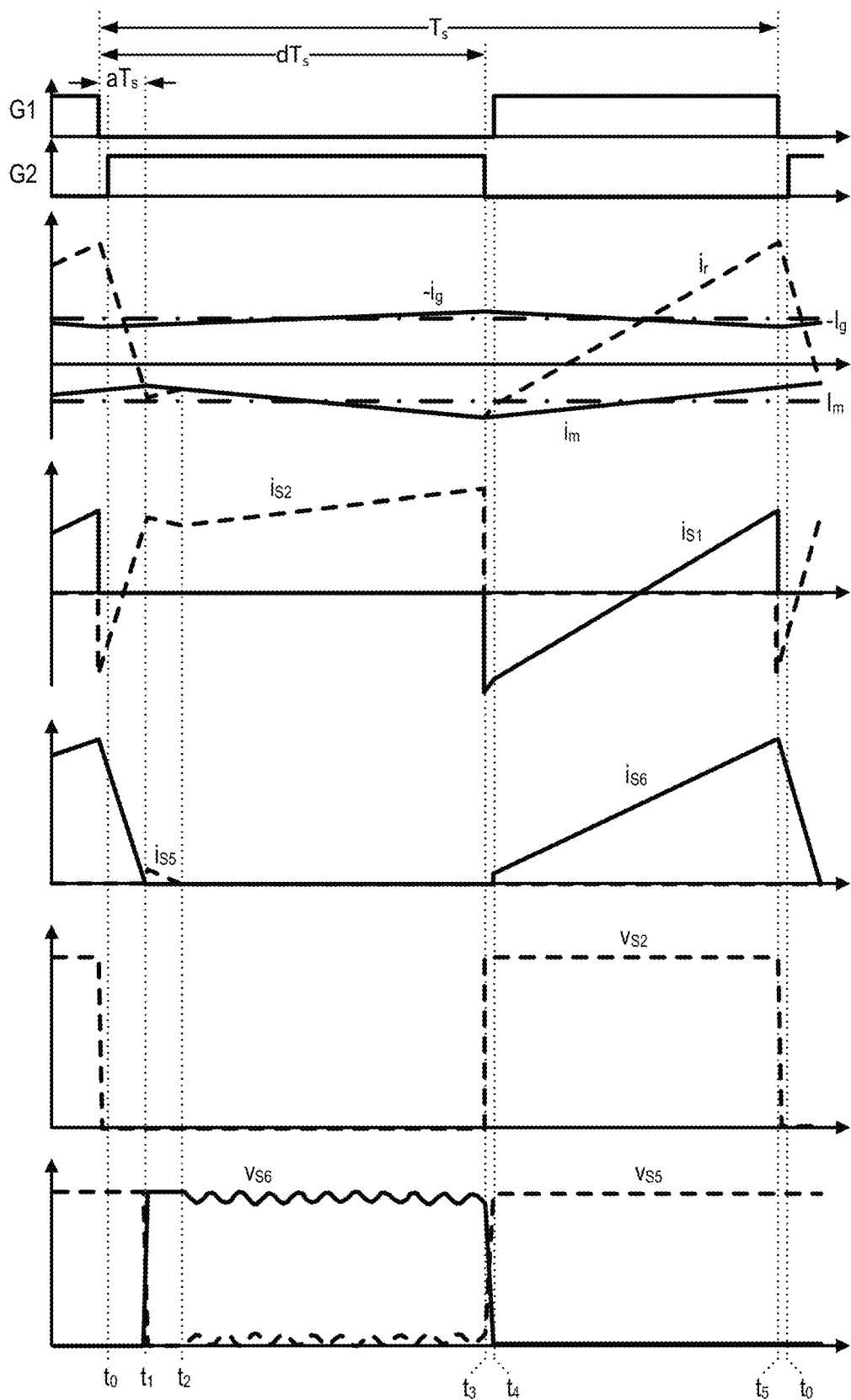
FIG. 4B is a graphical representation of operating waveforms of the first configuration of the AC-DC converter of FIG. 2A during the negative half-cycle as illustrated in FIGS. 3E-3H.

FIG. 3E is an equivalent circuit diagram of the first configuration of the AC-DC converter 10 of FIG. 2A during the negative half-cycle and the first interval. During the first interval [$t_0$, $t_1$], the main switch (second switch S2) and the output rectifier (sixth switch S6) are both on. The active clamp switch (first switch S1) is off. The two secondary winding voltages $v_{s1}$, $v_{s2}$ are both equal to the DC I/O voltage $v_{IO}$, while the voltage across the magnetizing inductor $L_m$ is clamped to $n*v_{IO}$. The fifth switch S5 is reverse biased with voltage $2*v_{IO}$. The magnetizing inductor $L_m$ is discharged by the DC I/O voltage $v_{IO}$. The coupling capacitor $C_C$ and the clamping capacitor $C_{cl}$ are connected in series. The resonant inductor current $i_r$ decreases linearly with slope $(-n*v_{IO}+v_C-v_{cl})/L_r$. This interval ends when the resonant inductor current $i_r$ becomes equal to the magnetizing current $i_m$, causing the sixth switch S6 to turn off and the fifth switch S5 to turn on.

Figure 3F:
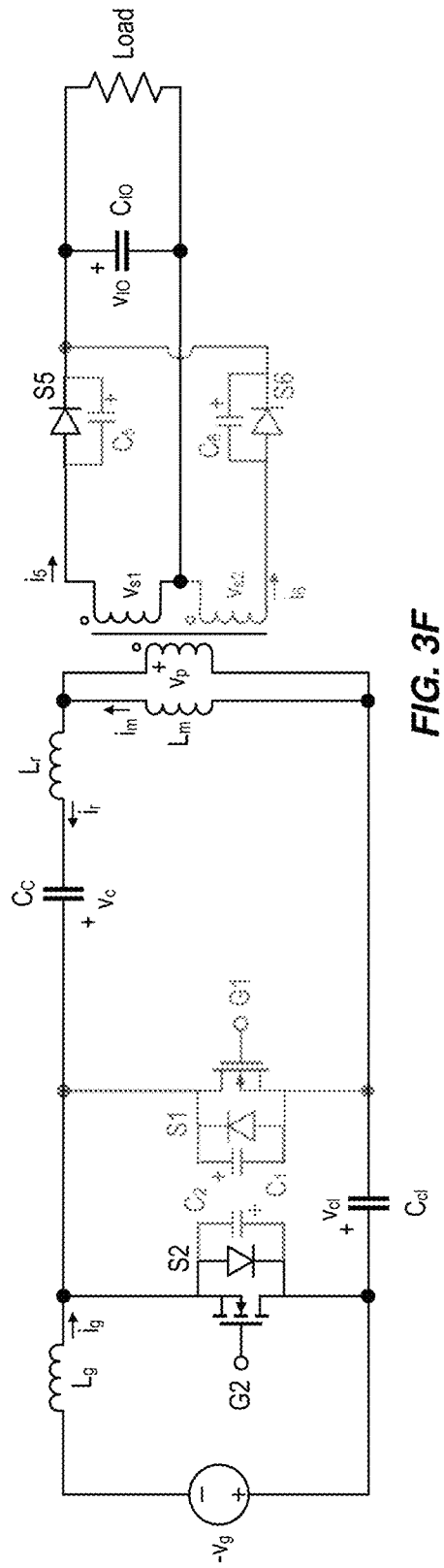
FIG. 3F is an equivalent circuit diagram of the first configuration of the AC-DC converter of FIG. 2A during the negative half-cycle and the second interval.

FIG. 3F is an equivalent circuit diagram of the first configuration of the AC-DC converter 10 of FIG. 2A during the negative half-cycle and the second interval. During the second interval [$t_1$, $t_2$], when the sixth switch S6 starts to turn off and the fifth switch S5 starts to turn on, their equivalent output capacitors C5 and C6 get charged and discharged, respectively, through resonance with the resonant inductor $L_r$. The resonant inductor current $i_r$ decreases by a small amount, which is negligible since the energy associated with the diode output capacitors are very small. The fifth switch S5 starts to conduct when the voltage across the output capacitor C5 decreases to zero.

The winding $N_{s1}$ is then clamped to $v_{IO}$. The reverse voltage across the sixth switch S6 will be clamped to $2*v_{IO}$, and the voltage across the magnetizing inductor $L_m$ will be clamped to $n*v_{IO}$. The coupling capacitor $C_C$ and the clamping capacitor $C_{cl}$ are connected in series. The resonant inductor current $i_r$ increases with slope $(n*v_{IO}+v_C-v_{cl})/L_r$. This interval ends when the resonant inductor current $i_r$ becomes equal to the magnetizing current again.

Figure 3G:
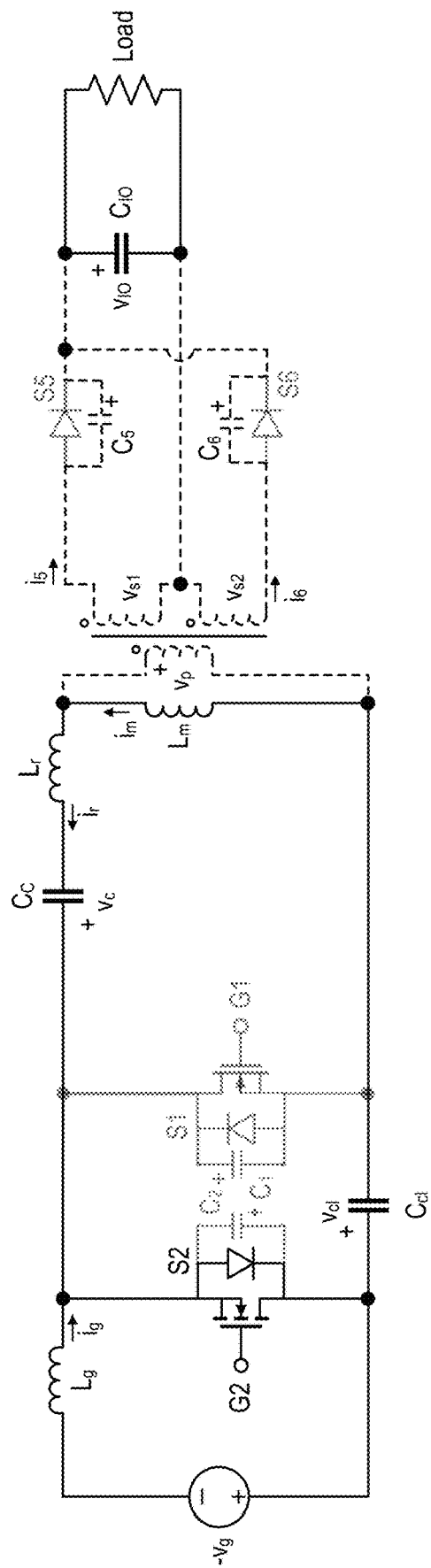
FIG. 3G is an equivalent circuit diagram of the first configuration of the AC-DC converter of FIG. 2A during the negative half-cycle and the third interval.

FIG. 3G is an equivalent circuit diagram of the first configuration of the AC-DC converter 10 of FIG. 2A during the negative half-cycle and the third interval. During the third interval [$t_2$, $t_3$], the sixth switch S6 and the fifth switch S5 are both off. The output capacitors C5 and C6 resonate with the resonant inductor $L_r$ with frequency $\omega_{res}$. Since the output capacitance of the diodes is very low, the corresponding impedance is very high. The part of the circuit illustrated with dashed lines can be considered open. The resonant inductor $L_r$ can be considered in series with the magnetizing inductor $L_m$, and both are charged by the anti-series connected clamping capacitor $C_{cl}$ and coupling capacitor $C_C$. The main switch (second switch S2) is turned off at the end of this interval.

During a fourth interval [$t_3$, $t_4$] (not shown due to its short switching transition), the second switch S2 is turned off. The sum of the input inductor current and the resonant inductor current $i_g+i_r$ charges the output capacitor C2 of the second switch S2 and discharges the output capacitor C1 of the first switch S1. The first switch S1 is turned on with zero drain-source voltage. The output capacitors C5 and C6 get charged and discharged, respectively, through resonance with the resonant inductor $L_r$.

Figure 3H:
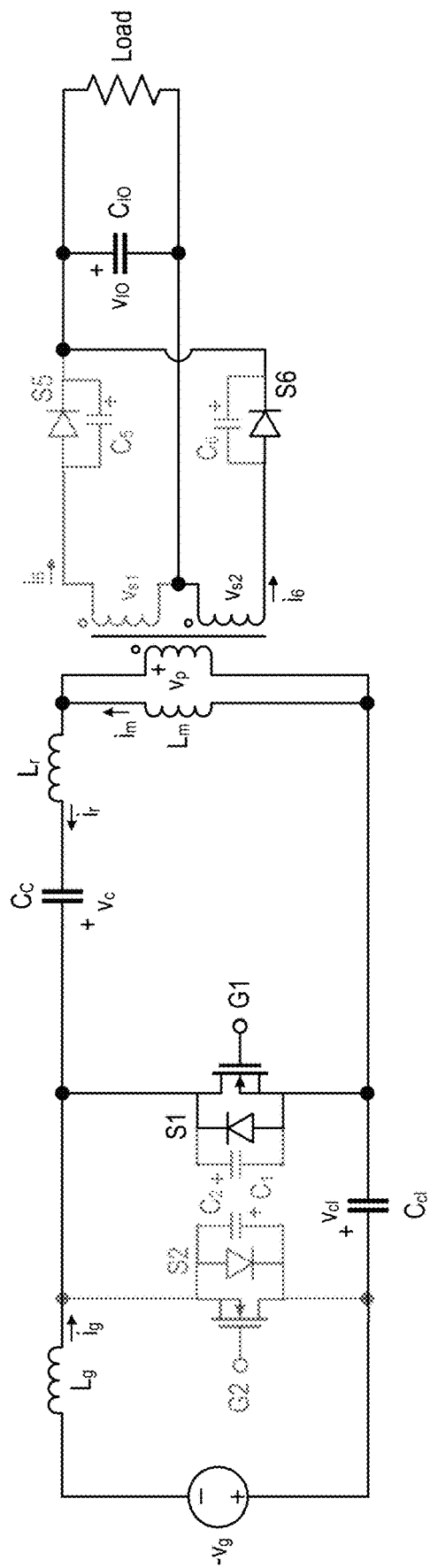
FIG. 3H is an equivalent circuit diagram of the first configuration of the AC-DC converter of FIG. 2A during the negative half-cycle and the fifth interval.

FIG. 3H is an equivalent circuit diagram of the first configuration of the AC-DC converter 10 of FIG. 2A during the negative half-cycle and the fifth interval. During the fifth interval [$t_4$, $t_5$], the first switch S1 and the sixth switch S6 are on. The second switch S2 and the fifth switch S5 are off. The magnetizing inductor $L_m$ is clamped by the DC I/O voltage $v_{IO}$. The voltage across the resonant inductor $L_r$ is equal to $-n*v_{IO}+v_C$. Both $i_r$ and $i_m$ increase. The clamping capacitor $C_{cl}$ is connected in series with the AC I/O inductor $L_g$ and gets charged by the inductor current $i_g$. This interval ends when the first switch S1 is turned off again.

During a sixth interval [$t_5$, $t_0$] (not shown due to its short switching transition), the sixth switch S6 continues to be on. $i_g+i_r$ is positive, and the DC I/O capacitor $C_{IO}$ of the second switch S2 is discharged when the first switch S1 is turned off. The body diode of the second switch S2 then starts to conduct, allowing the second switch S2 to be turned on with zero drain-source voltage.

FIG. 4A is a graphical representation of operating waveforms of the first configuration of the AC-DC converter 10 of FIG. 2A during the positive half-cycle as illustrated in FIGS. 3A-3D.

FIG. 4B is a graphical representation of operating waveforms of the first configuration of the AC-DC converter 10 of FIG. 2A during the negative half-cycle as illustrated in FIGS. 3E-3H.

With continuing reference to FIGS. 3A-3H, 4A, and 4B, during a fundamental cycle the clamp diode (sixth switch S6 in positive half-cycle, fifth switch S5 in negative half-cycle) acts as a snubber diode for the output rectifier and conducts for a very short time with very low current corresponding only to the transfer of the small energy stored in the output capacitance of the diodes. Therefore, interval 2 and its impact on the steady-state characteristic of the converter are neglected.

For the negative half-cycle topology, where v is negative, the volt-second balance on $L_g$, $L_r$ and $L_m$ gives the following equations:

$$v_{cl,N} = \frac{-v_g}{1-d} \quad \text{Equation 1}$$

$$v_{C,N} = \frac{-dv_g}{1-d} \quad \text{Equation 2}$$

$$v_{cl,N} - v_{C,N} = -v_g \quad \text{Equation 3}$$

whereas for the positive half-cycle ($v_g$ is positive)

$$v_{cl,P} = \frac{v_g}{1-d} \quad \text{Equation 4}$$

$$v_{C,P} = v_g \quad \text{Equation 5}$$

Observation on the equivalent circuits of the first, second, and third intervals of both positive and negative half-cycles reveals that they are topologically similar. From Equation 3 and Equation 5, the anti-series connection of coupling capacitor $C_C$ and clamping capacitor $C_{cl}$ in the negative half-cycle is equivalent to the coupling capacitor alone in the positive half-cycle. For the fifth interval, only the circuit topology on the primary side is slightly different for positive half-cycle and negative half-cycle. However, based on Kirchhoff's Voltage Law and the relations in Equations 1-5, the loop equations of the circuits are similar. Therefore, the quasi-static operating characteristic of the converter in the negative half-cycle is similar to that in the positive half-cycle, and the expressions of the voltage converter ratio and duty cycle in the positive half-cycle can also be applied to the converter in negative half-cycle.

Figure 5A:
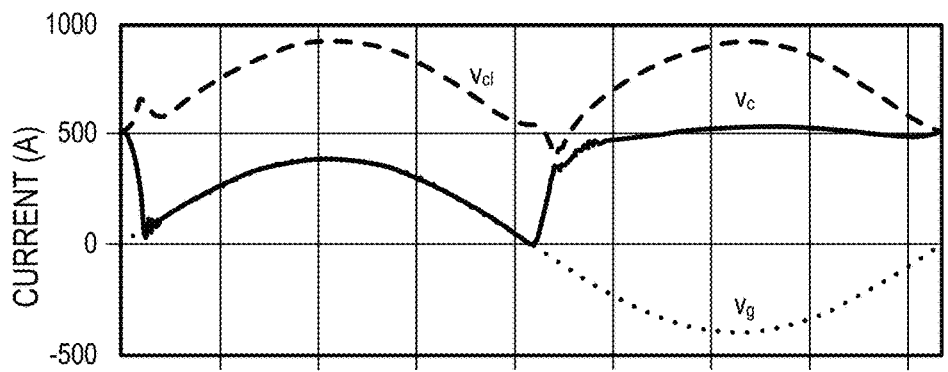
FIG. 5A is a graphical representation of simulated input voltage, coupling capacitor voltage, and clamping capacitor voltage waveforms of the first configuration of the AC-DC converter of FIG. 2A over a fundamental cycle.
Figure 5B:
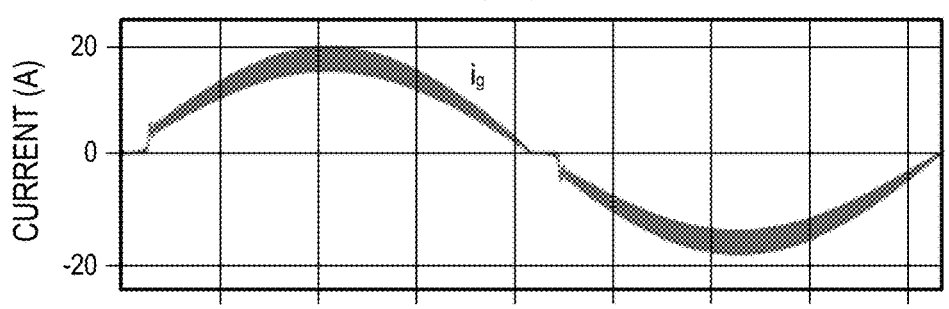
FIG. 5B is a graphical representation of a simulated AC input/output (I/O) inductor current waveform of the first configuration of the AC-DC converter of FIG. 2A over a fundamental cycle.
Figure 5C:
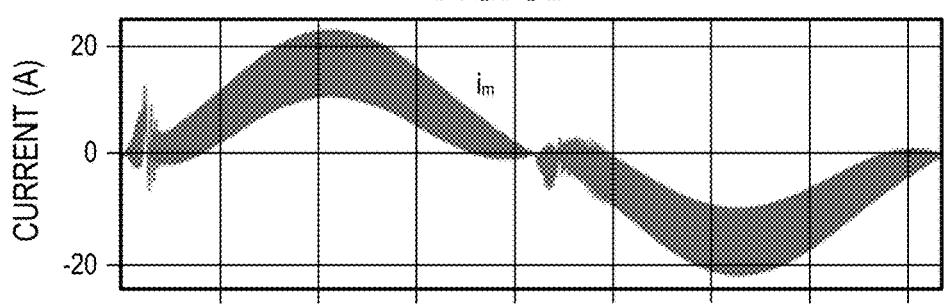
FIG. 5C is a graphical representation of a simulated magnetizing inductance current waveform of the first configuration of the AC-DC converter of FIG. 2A over a fundamental cycle.
Figure 5D:
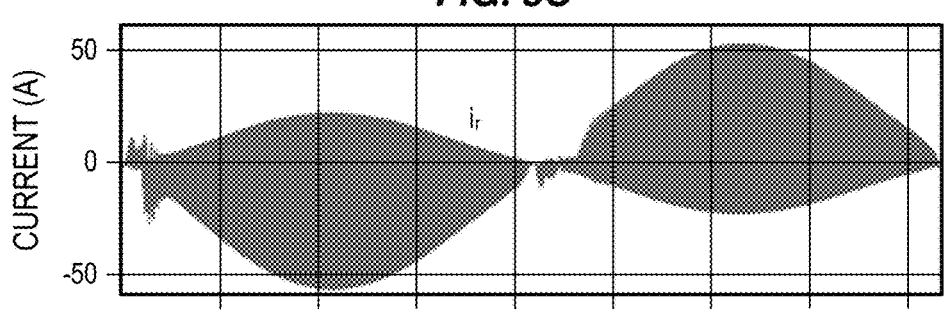
FIG. 5D is a graphical representation of a simulated resonant inductor current waveform of the first configuration of the AC-DC converter of FIG. 2A over a fundamental cycle.
Figure 5E:
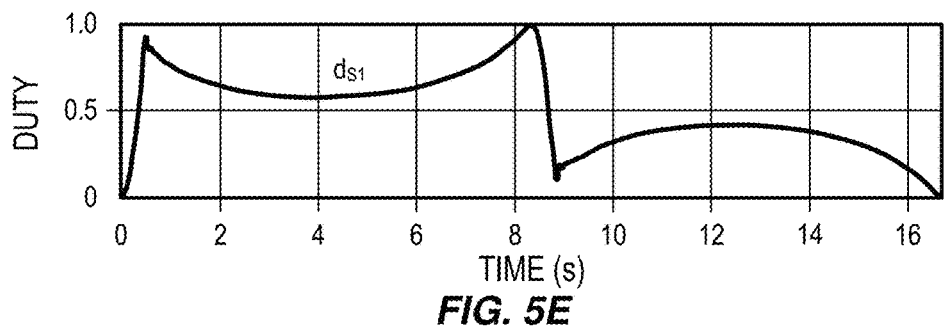
FIG. 5E is a graphical representation of a simulated duty ratio signal of the first switch of the first configuration of the AC-DC converter of FIG. 2A over a fundamental cycle.

FIG. 5A is a graphical representation of simulated input voltage $v_g$, coupling capacitor voltage $v_C$, and clamping capacitor voltage $v_{cl}$ waveforms of the first configuration of the AC-DC converter 10 of FIG. 2A over a fundamental cycle. FIG. 5B is a graphical representation of a simulated AC I/O inductor current $i_g$ waveform of the first configuration of the AC-DC converter 10 of FIG. 2A over a fundamental cycle. FIG. 5C is a graphical representation of a simulated magnetizing inductance current $i_m$ waveform of the first configuration of the AC-DC converter 10 of FIG. 2A over a fundamental cycle. FIG. 5D is a graphical representation of a simulated resonant inductor current $i_r$ waveform of the first configuration of the AC-DC converter 10 of FIG. 2A over a fundamental cycle. FIG. 5E is a graphical representation of a simulated duty ratio signal of the first switch $d_{S1}$ of the first configuration of the AC-DC converter 10 of FIG. 2A over a fundamental cycle.

With reference to FIGS. 5A-5E, the AC-DC converter 10 is simulated with parameters listed in Table 1. Besides the transient near the zero-crossings, the quasi-static relationship between $v_g$, $v_C$ and $v_{cl}$ is verified. The coupling capacitor voltage $v_C$ can be interpreted as output of a boost converter comprised of the input inductor and the high-frequency switching devices (the first switch S1 and the second switch S2), and is determined by the duty ratio d of the high-frequency switches and the input voltage. In the positive half-cycle, the coupling capacitor voltage $v_C$ is equal to the input voltage $v_g$. In the negative half-cycle, the coupling capacitor voltage $v_C$ is equal to the difference between the clamping capacitor voltage $v_{cl}$ and the absolute value of the input voltage $|v_g|$.

TABLE I

| Parameter | Value | Parameter | Value |
|---|---|---|---|
| $V_g$ | $277\sqrt{2}$ V | $V_{IO}$ | 400 V |
| $P_{IO}$ | 3.3 kW | R | 48.5 Ω |
| $L_g$ | 260 uH | $L_m$ | 90 uH |
| $L_r$ | 6.5 uH | n | 1.0 |
| $C_C$ | 2.2 uF | $C_{cl}$ | 2.2 uF |
| $C_{IO}$ | 2 × 390 + 2.2 uF | $f_s$ | 160 kHz |

Figure 5F:
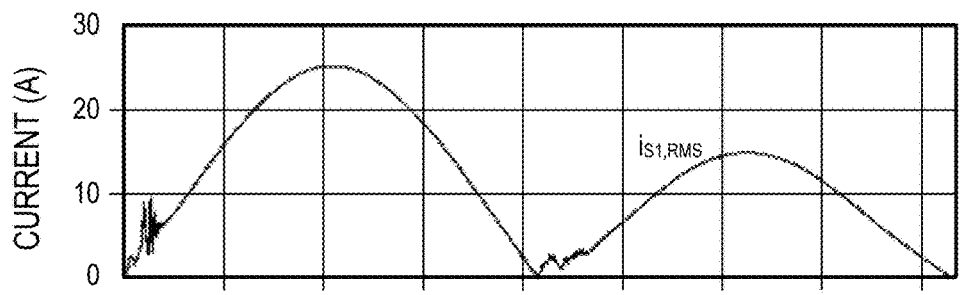
FIG. 5F is a graphical representation of a simulated cycle-by-cycle root mean square (RMS) current waveform in the first switch of the AC-DC converter of FIG. 2A.
Figure 5G:
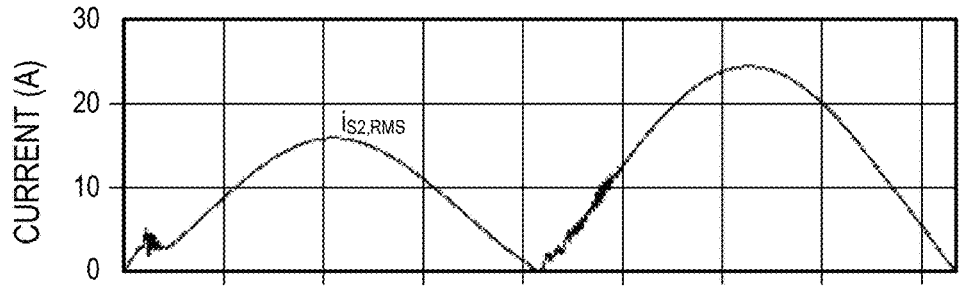
FIG. 5G is a graphical representation of a simulated cycle-by-cycle RMS current waveform in the second switch of the AC-DC converter of FIG. 2A.
Figure 5H:
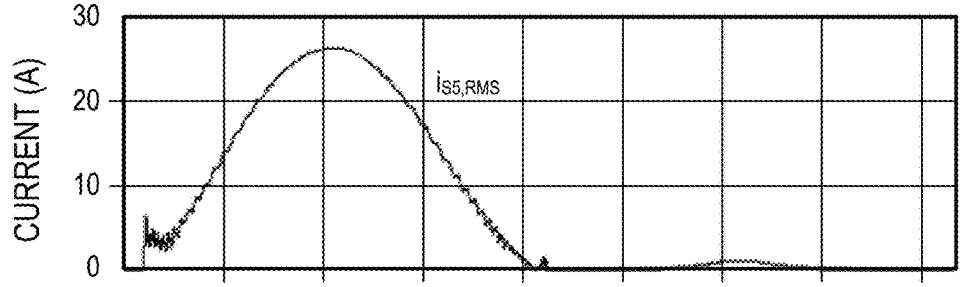
FIG. 5H is a graphical representation of a simulated cycle-by-cycle RMS current waveform in the fifth switch of the AC-DC converter of FIG. 2A.
Figure 5I:
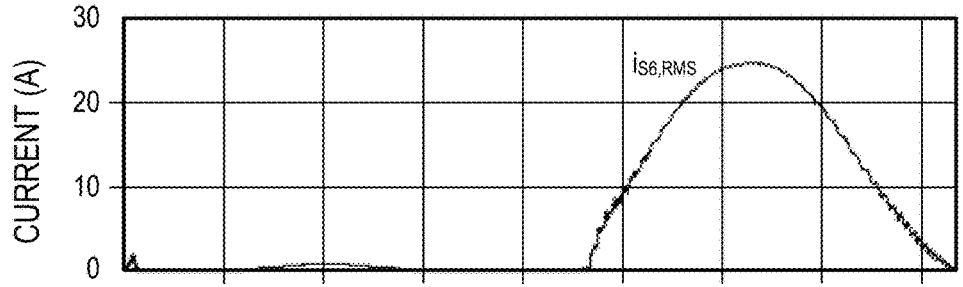
FIG. 5I is a graphical representation of a simulated cycle-by-cycle RMS current waveform in the sixth switch of the AC-DC converter of FIG. 2A.
Figure 5J:
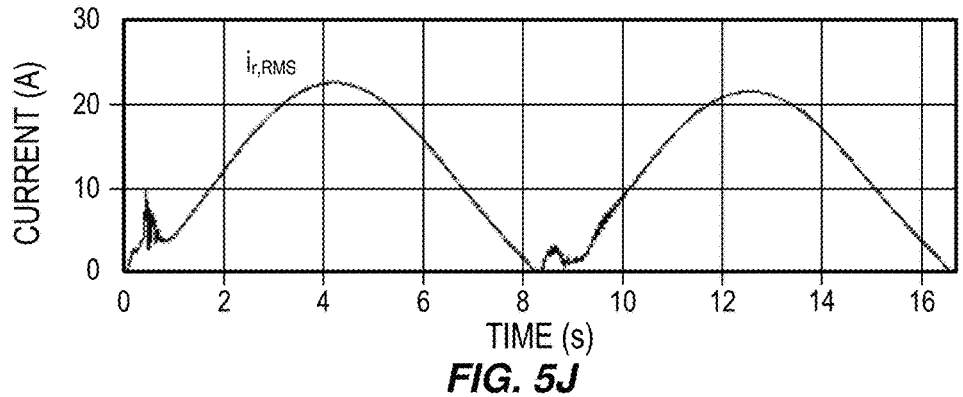
FIG. 5J is a graphical representation of a simulated cycle-by-cycle RMS current waveform in the resonant inductor of the AC-DC converter of FIG. 2A.

FIG. 5F is a graphical representation of a simulated cycle-by-cycle root mean square (RMS) current waveform in the first switch S1 of the AC-DC converter 10 of FIG. 2A. FIG. 5G is a graphical representation of a simulated cycle-by-cycle RMS current waveform in the second switch S2 of the AC-DC converter 10 of FIG. 2A. FIG. 5H is a graphical representation of a simulated cycle-by-cycle RMS current waveform in the fifth switch S5 of the AC-DC converter 10 of FIG. 2A. FIG. 5I is a graphical representation of a simulated cycle-by-cycle RMS current waveform in the sixth switch S6 of the AC-DC converter 10 of FIG. 2A. FIG. 5J is a graphical representation of a simulated cycle-by-cycle RMS current waveform in the resonant inductor $L_r$ of the AC-DC converter 10 of FIG. 2A.

With reference to FIGS. 5F-5J, from Equation 3 and Equation 5, the voltage across capacitor $C_C$ changes between $|v_g|$ and $(v_{cl}-|v_g|)$ in the positive and negative half-cycles, respectively. Due to finite charging/discharging time of the capacitor, transients and distortion in the input inductor current is observed near the zero-crossings. These can be alleviated by reducing the coupling capacitance $C_C$ and increasing the dynamic response speed of the input current control loop. Despite the coupling capacitor voltage waveform, the operation of the converter, especially the isolation transformer, is symmetrical in the positive and negative half-cycles. The currents in the fifth switch S5 and the sixth switch S6 are negligible when they are acting as snubber diodes.

Figure 6A:
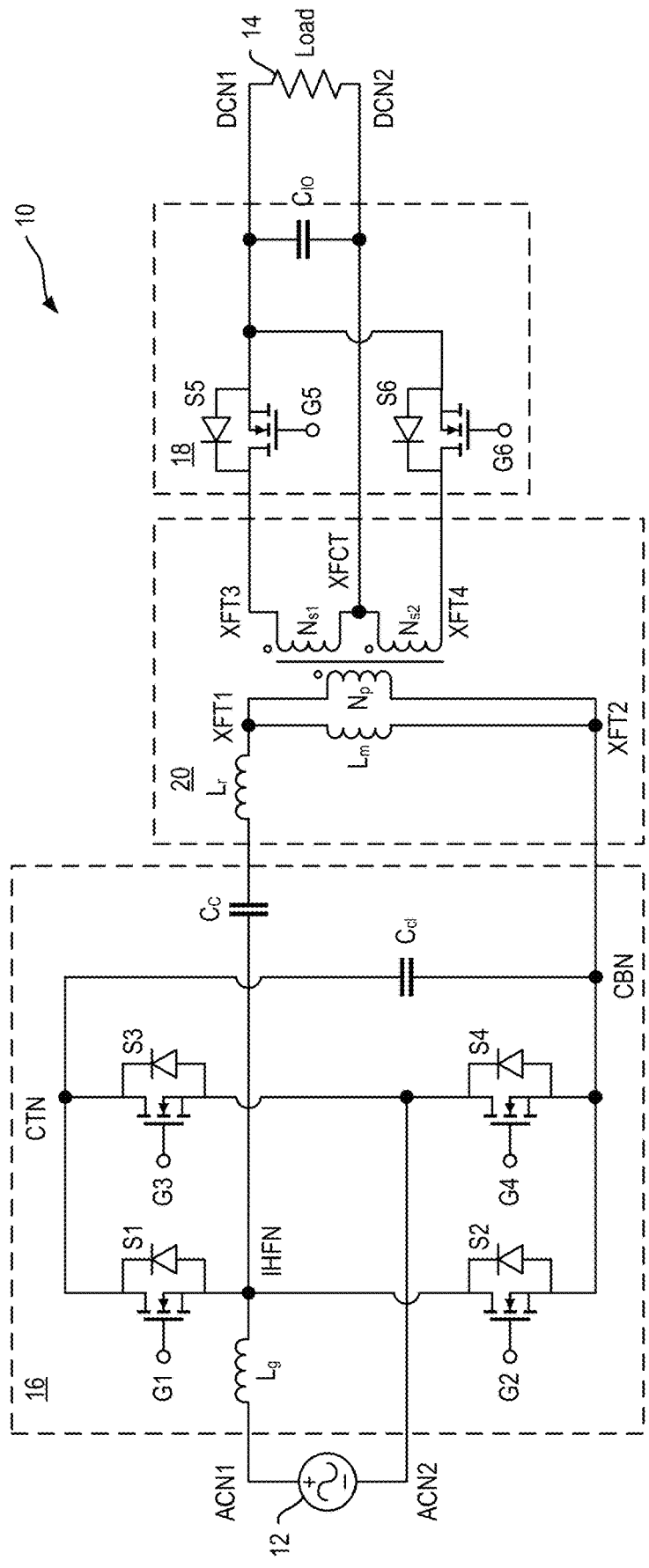
FIG. 6A is a schematic diagram of an exemplary bidirectional embodiment of the AC-DC converter of FIG. 2A.

FIGS. 6A-6D illustrate several variations of the circuit topology of the AC-DC converter 10 of FIG. 2A, which can also be applied to the additional configurations of FIGS. 7-9 below. FIG. 6A is a schematic diagram of an exemplary bidirectional embodiment of the AC-DC converter 10 of FIG. 2A. In some examples, the AC-DC converter 10 can be bidirectional, such that both AC-to-DC and DC-to-AC conversion can be provided through a same circuit. For example in a backup power solution, a battery array can be a DC load being charged by AC power during a first period and can be a DC source providing AC power during a second period.

Figure 6B:
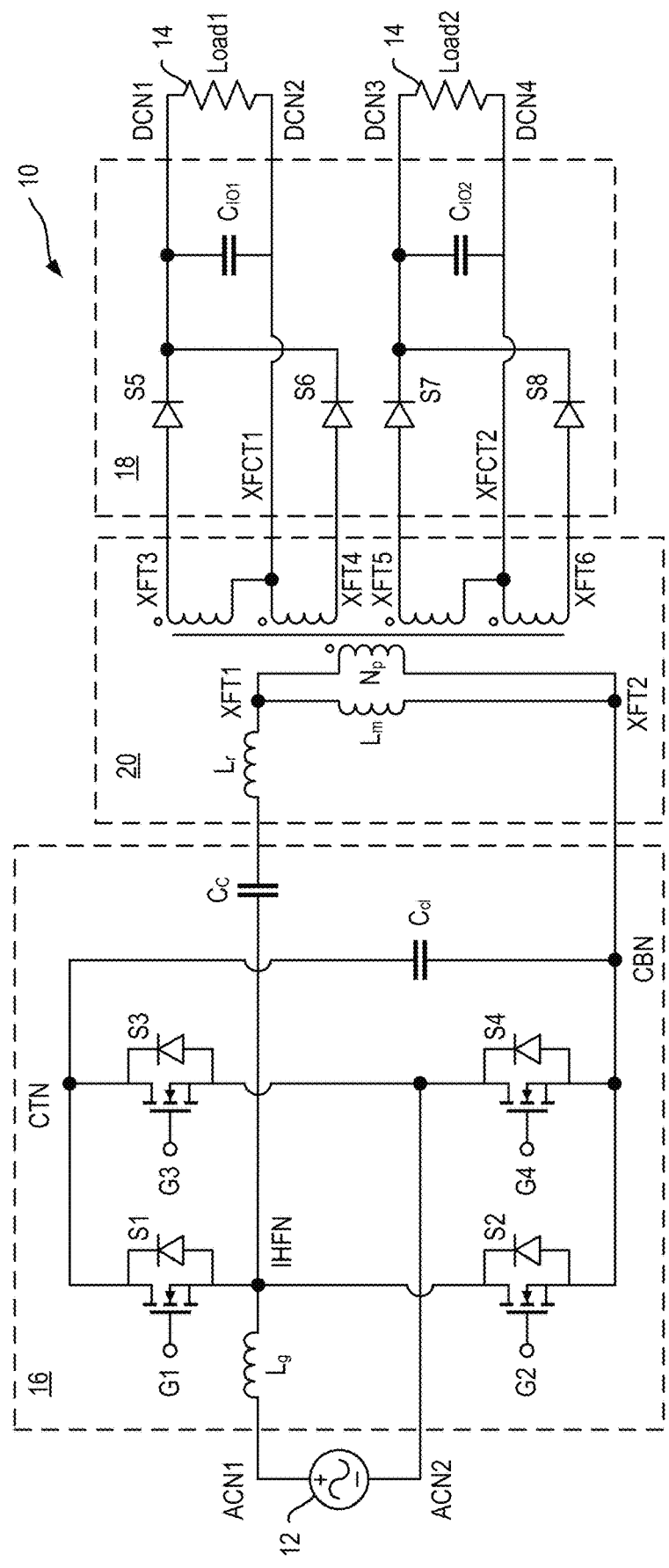
FIG. 6B is a schematic diagram of an exemplary multi-output embodiment of the AC-DC converter of FIG. 2A.

FIG. 6B is a schematic diagram of an exemplary multi-output embodiment of the AC-DC converter 10 of FIG. 2A. In some examples, multiple DC I/Os (e.g., at different voltage levels or to provide multiple isolated I/Os) may be coupled to the isolation transformer 20 in a manner similar to that described above with regard to FIG. 2A. In this regard, a first DC I/O (e.g., Load1) has a first DC I/O node DCN1, and a second DC I/O node DCN2 is coupled to a first secondary coil (e.g., at a third transformer terminal XFT3, fourth transformer terminal XFT4, and a first transformer center-tap XFCT1). In addition, a second DC I/O (e.g., Load2) has a third DC I/O node DCN3, and a fourth DC I/O node DCN4 is coupled to a second secondary coil (e.g., at a fifth transformer terminal XFT5, sixth transformer terminal XFT6, and a second transformer center-tap XFCT2).

Figure 6C:
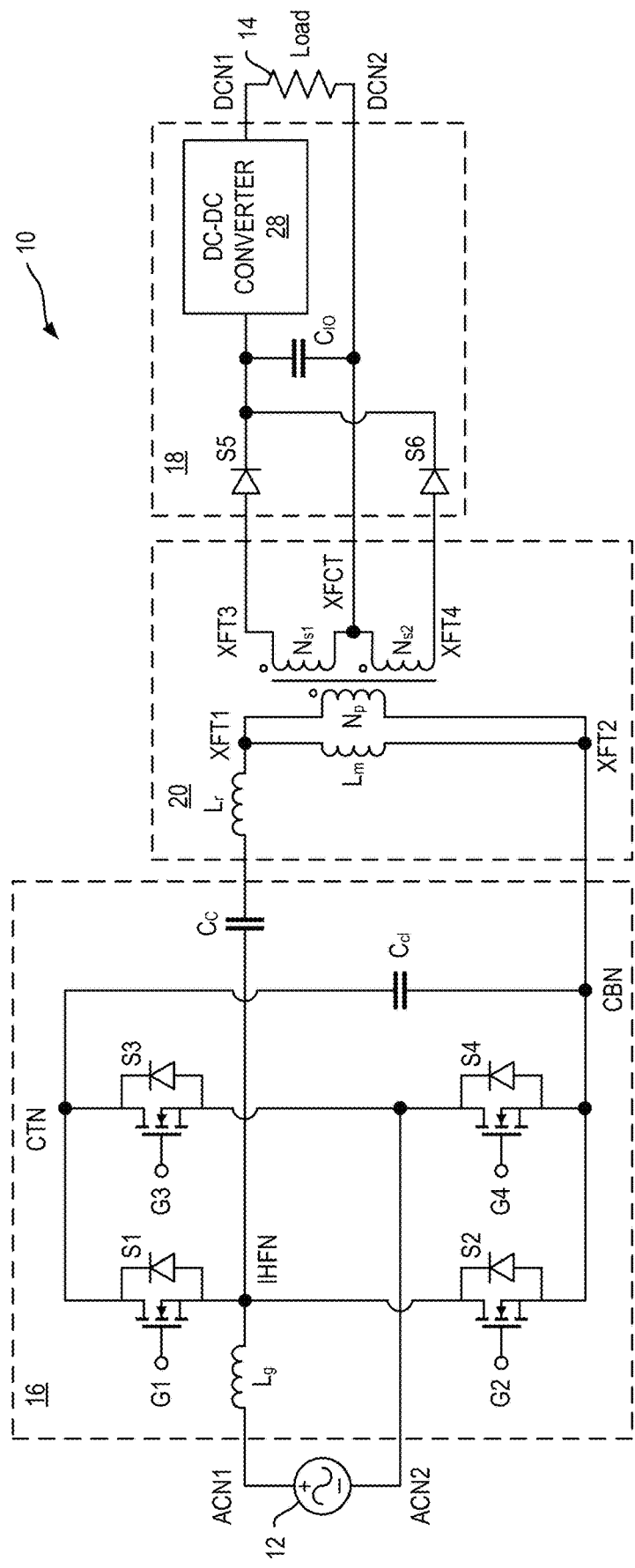
FIG. 6C is a schematic diagram of an exemplary embodiment of the AC-DC converter of FIG. 2A incorporating a DC-DC converter.

FIG. 6C is a schematic diagram an exemplary embodiment of the AC-DC converter 10 of FIG. 2A incorporating a DC-DC converter 28. In some embodiments, the DC-DC converter 28 provides partial power processing to meet design needs. For example, a series or parallel DC-DC converter 28 provides precise and independent control of output voltage, such as additional ripple control, a buck converter, a boost converter, filtering, voltage or current limiting circuitry, and so on.

Figure 6D:
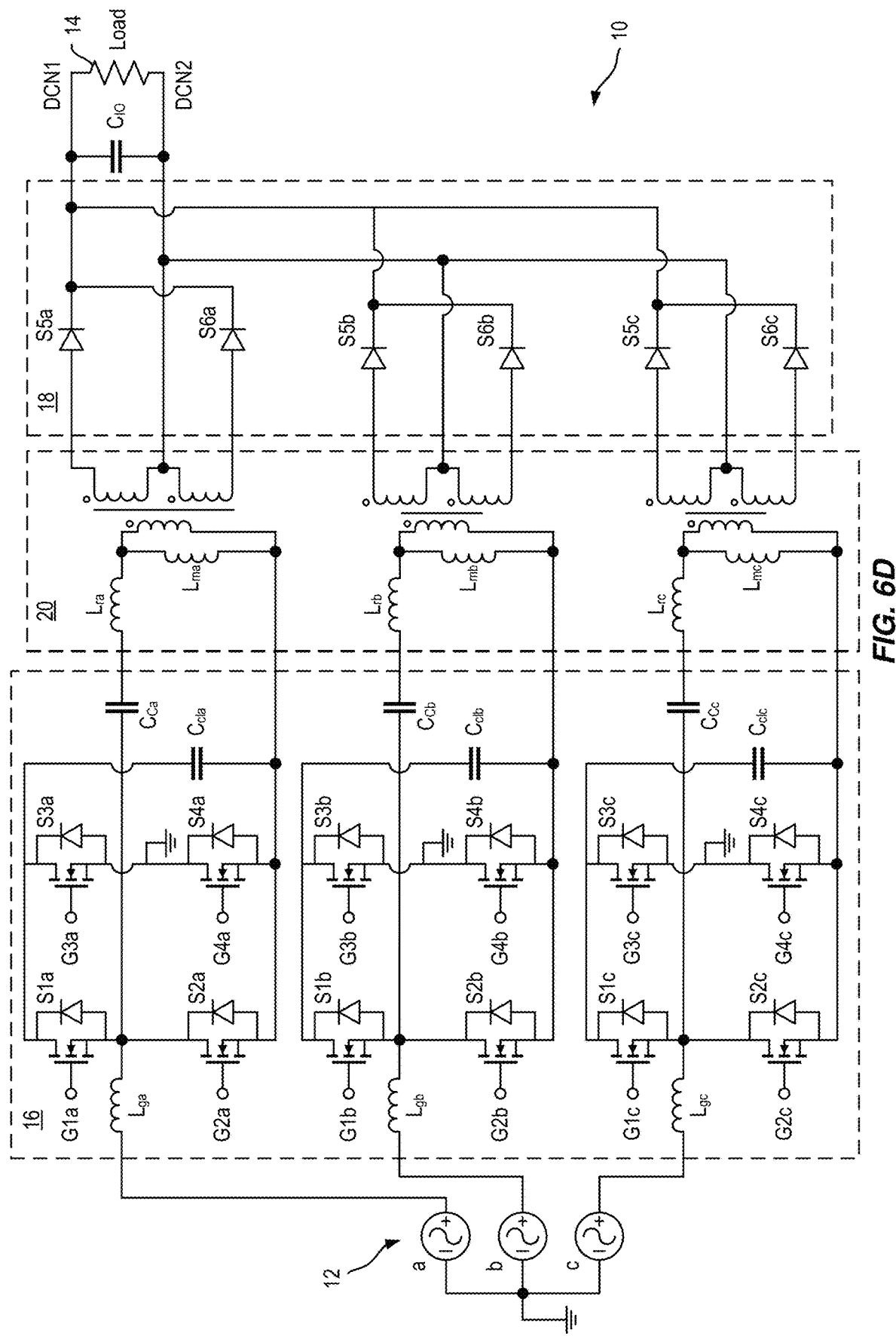
FIG. 6D is a schematic diagram of an exemplary three-phase embodiment of the AC-DC converter of FIG. 2A.

FIG. 6D is a schematic diagram of an exemplary three-phase embodiment of the AC-DC converter 10 of FIG. 2A. In some embodiments, the AC circuit 16, the DC circuit 18, and the isolation transformer 20 can include three parallel sets of circuitry connected to each of three AC I/O phases A, B, and C. In this regard, the first DC I/O node DCN1 is connected to the fifth switch S5a, S5b, S5c and the sixth switch S6a, S6b, S6c of each of the A, B, and C phases. The second DC I/O node DCN2 is connected to the transformer center-tap of each of the A, B, and C phases.

FIG. 7 is a schematic diagram of an exemplary second configuration of the AC-DC converter 10 of FIG. 1. In the second configuration, the second transformer terminal XFT2 of the first coil of the transformer 20 is connected to the second AC I/O node ACN2 (rather than the common bottom node CBN as in FIG. 2A).

FIG. 8 is a schematic diagram of an exemplary third configuration of the AC-DC converter 10 of FIG. 1. In the third configuration, the second transformer terminal XFT2 of the first coil of the transformer 20 is connected to the common top node CTN (rather than the common bottom node CBN as in FIG. 2A).

FIG. 9 is a schematic diagram of an exemplary fourth configuration of the AC-DC converter 10 of FIG. 1. In the fourth configuration, the high-frequency switches (the first switch S1 and the second switch S1) are connected in series between the common top node CTN and the common bottom node CBN. Rather than a single clamping capacitor, each of the line switches (the third switch S3 and the fourth switch S4) is connected in series with a corresponding clamping capacitor (a first clamping capacitor $C_{cl1}$ and a second clamping capacitor $C_{cl2}$) between the common top node CTN and the common bottom node CBN.

The first AC I/O node ACN1 is connected to the common top node CTN via the AC I/O inductor $L_g$ and the first transformer terminal XFT1 is connected to the common top node CTN via the coupling capacitor $C_C$ and the resonant inductor $L_r$. The second AC I/O node ACN2 and the second transformer terminal XFT2 are connected to the common bottom node CBN.

Those skilled in the art will recognize improvements and modifications to the preferred embodiments of the present disclosure. All such improvements and modifications are considered within the scope of the concepts disclosed herein and the claims that follow.

What is claimed is:

1. An alternating current (AC)-direct current (DC) converter, comprising:
    an AC input/output (I/O) comprising a first AC I/O node and a second AC I/O node;
    a DC I/O comprising a first DC I/O node and a second DC I/O node;
    an isolation transformer, comprising:
        a first coil comprising a first terminal coupled to the first AC I/O node and a second terminal; and
        a second coil magnetically coupled to the first coil and comprising a third terminal coupled to the first DC I/O node and a fourth terminal coupled to the second DC I/O node;
    a first switch coupled between the first AC I/O node and a common top node;
    a second switch coupled between the first AC I/O node and a common bottom node;
    a first capacitor coupled across the first switch and the second switch;
    a third switch connected between the common top node and the second AC I/O node; and
    a fourth switch connected between the second AC I/O node and the second terminal of the first coil of the isolation transformer;
    wherein:
        the third switch and the fourth switch are configured to switch at a line frequency; and
        the first switch and the second switch are configured to switch at a higher switching frequency than the line frequency.

2. The AC-DC converter of claim 1, wherein the second terminal of the first coil is connected to the common bottom node.

3. The AC-DC converter of claim 1, wherein the second terminal of the first coil is connected to the second AC I/O node.

4. The AC-DC converter of claim 1, wherein the second terminal of the first coil is connected to the common top node.

5. The AC-DC converter of claim 1, further comprising an inductor connected between the first AC I/O node and an intermediate high-frequency node; wherein:
    the first switch is connected between the intermediate high-frequency node and the common top node; and
    the second switch is connected between the intermediate high-frequency node and the common bottom node.

6. The AC-DC converter of claim 5, further comprising a second capacitor connected between the intermediate high-frequency node and the first terminal of the first coil of the isolation transformer.

7. The AC-DC converter of claim 1, wherein the line frequency is between 20 Hz and 1000 Hz.

8. The AC-DC converter of claim 1, wherein the first switch and the second switch are controlled such that they become closed when a voltage across a respective switch is zero.

9. The AC-DC converter of claim 1, wherein the first switch, the second switch, the third switch, and the fourth switch are controlled such that a current from the AC I/O is sinusoidal and at unity power factor.

10. The AC-DC converter of claim 1, wherein each of the third switch and the fourth switch comprises a diode.

11. The AC-DC converter of claim 1, further comprising a rectifier coupled between the second coil and the DC I/O.

12. The AC-DC converter of claim 11, wherein the fourth terminal of the second coil is a center-tap terminal and the rectifier comprises:
    a fifth switch connected between the third terminal of the second coil of the isolation transformer and the first DC I/O node; and
    a sixth switch connected between a fifth terminal of the second coil of the isolation transformer and the first DC I/O node.

13. The AC-DC converter of claim 12, wherein the rectifier is a full-wave rectifier.

14. The AC-DC converter of claim 12, further comprising a DC I/O capacitor connected between the first DC I/O node and the second DC I/O node.

15. A circuit, comprising:
    an isolation transformer, comprising:
        a primary coil; and
        a secondary coil;

a direct current (DC) circuit coupled to the isolation transformer; and an alternating current (AC) circuit coupled to the isolation transformer and galvanically isolated from the DC circuit, the AC circuit comprising:
 a bridgeless single-stage power factor correction circuit isolated from the DC circuit;
 a first zero-voltage switch (ZVS) connected in shunt to a first node between an AC source or load and a first terminal of the primary coil; and
 a second ZVS connected in shunt to the first node.

16. The circuit of claim 15, wherein the AC circuit further comprises:
 a first line frequency switch connected to the first ZVS; and
 a second line frequency switch connected in series with the first line frequency switch.

17. The circuit of claim 16, wherein the DC circuit comprises:
 a first rectifier switch coupled between a second terminal of the secondary coil and a DC source or load; and
 a second rectifier switch coupled between a third terminal of the secondary coil and the DC source or load.

18. An alternating current (AC)-direct current (DC) converter, comprising:
 an AC input/output (I/O) comprising a first AC I/O node and a second AC I/O node;
 a DC I/O comprising a first DC I/O node and a second DC I/O node;
 an isolation transformer, comprising:
  a first coil comprising a first terminal coupled to the first AC I/O node and a second terminal; and
  a second coil magnetically coupled to the first coil and comprising a third terminal coupled to the first DC I/O node and a fourth terminal coupled to the second DC I/O node;
 an inductor connected between the first AC I/O node and an intermediate high-frequency node;
 a first switch coupled between the intermediate high-frequency node and a common top node;
 a second switch coupled between the intermediate high-frequency node and a common bottom node;
 a first capacitor coupled across the first switch and the second switch;
 a third switch connected between the common top node and the second AC I/O node; and
 a fourth switch connected between the second AC I/O node and the second terminal of the first coil of the isolation transformer.

19. The AC-DC converter of claim 18, further comprising a second capacitor connected between the intermediate high-frequency node and the first terminal of the first coil of the isolation transformer.

20. The AC-DC converter of claim 18, further comprising a rectifier coupled between the second coil and the DC I/O, the rectifier comprising:
 a fifth switch connected between the third terminal of the second coil of the isolation transformer and the first DC I/O node; and
 a sixth switch connected between a fifth terminal of the second coil of the isolation transformer and the first DC I/O node.

* * * * *